US011973912B2

(12) United States Patent
Seo

(10) Patent No.: US 11,973,912 B2
(45) Date of Patent: Apr. 30, 2024

(54) IMAGE PROCESSING APPARATUS, LOG INFORMATION MANAGEMENT SYSTEM, AND LOG INFORMATION MANAGEMENT METHOD

(71) Applicant: SHARP KABUSHIKI KAISHA, Sakai (JP)

(72) Inventor: Kayoko Seo, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/237,065

(22) Filed: Aug. 23, 2023

(65) Prior Publication Data
US 2024/0098203 A1    Mar. 21, 2024

(30) Foreign Application Priority Data

Sep. 15, 2022  (JP) ................................ 2022-147308

(51) Int. Cl.
  *H04N 1/00* (2006.01)
  *H04N 1/32* (2006.01)
(52) U.S. Cl.
  CPC ..... *H04N 1/32496* (2013.01); *H04N 1/32122* (2013.01); *H04N 2201/3202* (2013.01)
(58) Field of Classification Search
  CPC ................... H04N 1/32122; H04N 2201/3202
  See application file for complete search history.

(56) References Cited

U.S. PATENT DOCUMENTS

| | | | | |
|---|---|---|---|---|
| 2008/0018931 A1* | 1/2008 | Tanaka | .................. | G06F 3/1204 358/1.15 |
| 2014/0289370 A1* | 9/2014 | Hamada | .............. | H04L 67/1001 709/219 |
| 2015/0324161 A1* | 11/2015 | Shibuya | ................ | G06F 3/1203 358/1.15 |
| 2016/0041865 A1* | 2/2016 | Uruma | ................ | G06F 11/0787 714/48 |
| 2022/0050648 A1* | 2/2022 | Katayama | ............. | G06F 3/1204 |
| 2022/0239786 A1* | 7/2022 | Tsujinaka | ........... | H04N 1/00244 |

(Continued)

FOREIGN PATENT DOCUMENTS

JP    2006-099479 A    4/2006
JP    2008-003862 A    1/2008

*Primary Examiner* — Benjamin O Dulaney
(74) *Attorney, Agent, or Firm* — ScienBiziP, P.C.

(57) ABSTRACT

An image processing apparatus includes a controller capable of generating occurrence of an event to be audited, as log information; a storage that stores the log information; an outputter that reads and outputs the log information stored in the storage in response to an acquisition request for the log information by an information processing apparatus; and an adder that adds, to the log information, identification information indicating that the log information has been stored in the information processing apparatus. The controller stores the log information added with the identification information in the storage. In a case where a storage amount of the log information stored in the storage has reached an upper limit when newly storing log information generated in association with occurrence of the event, the controller deletes the log information added with the identification information from the storage, and stores the generated log information.

14 Claims, 21 Drawing Sheets

(56) References Cited

U.S. PATENT DOCUMENTS

2022/0269455 A1* 8/2022 Kakutani ............. G06F 3/1238
2023/0262186 A1* 8/2023 Nakashima ........... G06F 3/1273
358/1.15

* cited by examiner

FIG. 13A

| # | Event | Timestamp 1 | Timestamp 2 | Source | Result | User | Target | Status | Info | Count |
|---|---|---|---|---|---|---|---|---|---|---|
| 5 | Audit End | 2022-04-19T16:39:45+09:00 | N/A | N/A | Success | N/A | N/A | ★ | [5,] | |
| 6 | Audit Start | 2022-04-19T16:40:06+09:00 | N/A | N/A | Success | N/A | Network | [★] F10 | 3 | N10 |
| 7 | I&A Success | | 2022-04-19T16:40:12+09:00 | Web | admin | N/A | aaa.bbb.ccc.ddd | ★ | | 2 |
| 8 | Audit End | 2022-04-19T16:55:09+09:00 | N/A | N/A | Success | N/A | N/A | | 1 | |
| 844 | Audit Start | 2022-05-10T09:07:45+09:00 | N/A | N/A | N/A | N/A | N/A | | Reboot | |
| 845 | I&A Success | 2022-05-10T10:15:39+09:00 | Web | admin | N/A | ccc.ddd.eee.fff | | | | |
| 846 | Login Terminated | 2022-05-10T11:15:48+09:00 | Web | admin | N/A | N/A | | Timeout | | |
| 847 | I&A Success | 2022-05-10T14:55:23+09:00 | Web | admin | N/A | ggg.hhh.iii.jjj | | | | |

FIG. 13B

| # | Event | Timestamp 1 | Timestamp 2 | Source | Result | User | Target | Status | Info | Count |
|---|---|---|---|---|---|---|---|---|---|---|
| 5 | ~~Audit End~~ | ~~2022-04-19T16:39:45+09:00~~ | ~~N/A~~ | ~~N/A~~ | ~~Success~~ | ~~N/A~~ | ~~N/A~~ | ★ | 3 | |
| 6 | Audit Start | 2022-04-19T16:40:06+09:00 | N/A | N/A | Success | N/A | Network | ★ | 3 | |
| 7 | I&A Success | | 2022-04-19T16:40:12+09:00 | Web | admin | N/A | aaa.bbb.ccc.ddd | ★ | | 2 |
| 8 | Audit End | 2022-04-19T16:55:09+09:00 | N/A | N/A | Success | N/A | N/A | | 1 | |
| 844 | Audit Start | 2022-05-10T09:07:45+09:00 | N/A | N/A | N/A | N/A | N/A | | Reboot | |
| 845 | I&A Success | 2022-05-10T10:15:39+09:00 | Web | admin | N/A | ccc.ddd.eee.fff | | | | |
| 846 | Login Terminated | 2022-05-10T11:15:48+09:00 | Web | admin | N/A | N/A | | Timeout | | |
| 847 | I&A Success | 2022-05-10T14:55:23+09:00 | Web | admin | N/A | ggg.hhh.iii.jjj | | | | |

FIG. 13C

| # | Event | Timestamp 1 | Timestamp 2 | Source | Result | User | Target | Status | Info | Count |
|---|---|---|---|---|---|---|---|---|---|---|
| 6 | Audit Start | 2022-04-19T16:40:06+09:00 | N/A | N/A | Success | N/A | Network | ★ | 3 | |
| 7 | I&A Success | | 2022-04-19T16:40:12+09:00 | Web | admin | N/A | aaa.bbb.ccc.ddd | ★ | | 2 |
| 8 | Audit End | 2022-04-19T16:55:09+09:00 | N/A | N/A | Success | N/A | N/A | | 1 | |
| 844 | Audit Start | 2022-05-10T09:07:45+09:00 | N/A | N/A | N/A | N/A | N/A | | Reboot | |
| 845 | I&A Success | 2022-05-10T10:15:39+09:00 | Web | admin | N/A | ccc.ddd.eee.fff | | | | |
| 846 | Login Terminated | 2022-05-10T11:15:48+09:00 | Web | admin | N/A | N/A | | Timeout | | |
| 847 | I&A Success | 2022-05-10T14:55:23+09:00 | Web | admin | N/A | ggg.hhh.iii.jjj | | | | |
| 848 | Change Setting | 2022-05-10T16:36:02+09:00 | Web | admin | Success | N/A | Security Settings, Password Settings | ★★★★★ | | 2 |

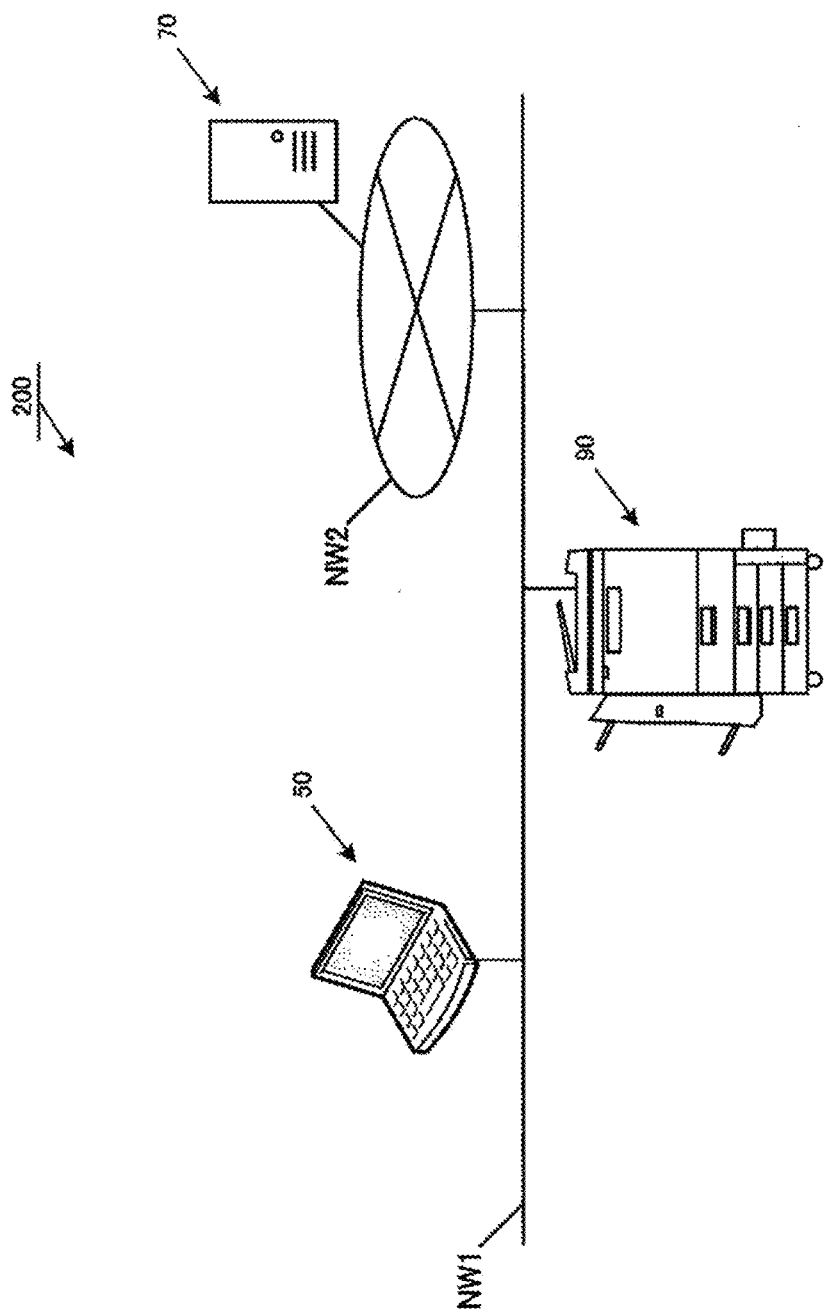

FIG. 21A

```
1000  Change Time Setting   2021-11-02T02:38:07+00:00  Net   N/A      Success    N/A
1001  Firm Update           2021-11-02T02:44:51+00:00  Ope   service  Success    [UPDATE FILE:/media/usb/updatefile_aaa_build.sfu]
[VERSION: (1.0.1)->(1.0.2)]
1002  Audit End             2021-11-02T02:45:15+00:00  N/A   N/A      Success    N/A
1003  Audit Start           2021-11-02T02:48:14+00:00  N/A   N/A      Success    Reboot
1004  Change Time Setting   2021-11-02T02:48:32+00:00  Net   N/A      Success    N/A
1005  Login Terminated      2021-11-02T02:50:48+00:00  Ope   N/A      N/A        Logout
```

FIG. 21B

DISPLAY AUDIT LOG

UPDATE(R)

AUDIT LOG

| ID | EVENT NAME | EVENT OCCURRENCE DATE AND TIME | OPERATION I/F | LOGIN NAME | OPERATION RESULT | OTHER INFORMATION |
|---|---|---|---|---|---|---|
| 1000 | Change Time Setting | 2021-11-02T02:38:07+00:00 | Net | N/A | Success | N/A |
| 1001 | Firm Update | 2021-11-02T02:44:51+00:00 | Ope | service | Success | [UPDATE FILE:/media/usb/updatefile_aaa_build.sfu] [VERSION: (1.0.1)->(1.0.2)] |
| 1002 | Audit End | 2021-11-02T02:45:15+00:00 | N/A | N/A | Success | N/A |
| 1003 | Audit Start | 2021-11-02T02:48:14+00:00 | N/A | N/A | Success | N/A |
| 1004 | Change Time Setting | 2021-11-02T02:48:32+00:00 | Net | N/A | Success | N/A |
| 1005 | Login Terminated | 2021-11-02T02:50:48+00:00 | Ope | N/A | N/A | Logout |

IMAGE PROCESSING APPARATUS, LOG INFORMATION MANAGEMENT SYSTEM, AND LOG INFORMATION MANAGEMENT METHOD

BACKGROUND OF THE INVENTION

Field of the Invention

The present disclosure relates to an image processing apparatus and the like.

Description of the Background Art

In the field of digital multifunction peripherals, the Hard Copy Device Protection Profile (HCD PP) has been established as security requirements for government procurement in Japan and the United States. The HCD PP is required to achieve generation of an audit log based on an occurring event, saving of a generated audit log without omission, and review of the audit log in order to enable to monitor an event of security requirements by an administrator.

In general, an apparatus such as a multifunction peripheral that generates an audit log includes an audit storage for storing a generated audit log. The administrator performs an operation of acquiring an audit log stored in an audit storage via a Web page or the like, and saving the audit log at hand (saving of an audit log) in order to review the audit log.

In the HCD PP, in a case where the storage amount of audit logs to be stored in an audit storage has reached the upper limit, there is a requirement that an audit log having the oldest history should be deleted, and a newly generated audit log should be stored. When this requirement is satisfied, an audit log may be overwritten without the user's intention. In order to prevent overwriting, a function of deleting an audit log (deletion of an audit log) stored in the audit storage in the apparatus is provided.

In a case of a configuration in which audit logs are deleted (overwritten) in order from an audit log having the oldest history, in a case where the storage amount of the audit logs has reached the upper limit, there is no guarantee that the audit logs stored in the audit storage continue to be stored in the future. Therefore, it is necessary for the administrator to save the audit logs at hand until the storage amount of the audit storage reaches the upper limit, delete the audit logs stored in the audit storage, and secure the storage amount of the audit storage.

However, for example, in a case where an audit log is transmitted from the apparatus to the administrator side, an operation of "saving an audit log" is performed on the administrator side, and then, an instruction to delete an audit log stored in the audit storage is input to the apparatus, an audit log related to an event that has occurred after transmission of the audit log to the administrator side until an input of an instruction to delete the audit log is deleted in association with the input of the deletion instruction. This may cause a possibility that the administrator may overlook the audit log.

Regarding handling of audit logs, for example, in a conventional art, there is known a hospital audit log management support system including a hospital audit log server that generates and transmits an audit log policy related to an audit target, and an audit log client device that generates an audit log in accordance with the received audit log policy, wherein an audit log generated by the audit log client device is automatically collected by the hospital audit log server.

In addition, in another conventional art, there is known an audit log generation device that receives, from an electronic device that performs processing in response to a request from the outside, data such as a processing content included in the request, and generates a log by referring to a table in which a description item and a description format of a log being an execution history of the processing are associated with the processing content.

In both of the conventional arts, although log management in the entirety of an audit log system has a feature, a technical means capable of reducing omission of saving of an audit log in accordance with a desired audit log requirement is not sufficient disclosed.

An object of the present disclosure is to provide an image processing apparatus and the like capable of reducing omission of saving of an audit log to be stored in an audit storage, and reviewing the audit log.

SUMMARY OF THE INVENTION

In order to solve the above problem, an image processing apparatus according to the present disclosure includes: a controller capable of generating occurrence of an event to be audited, as log information; a storage that stores the log information; an outputter that reads and outputs the log information stored in the storage in response to an acquisition request for the log information by an information processing apparatus; and an adder that adds, to the log information, identification information indicating that the log information has been stored in the information processing apparatus. The controller stores the log information added with the identification information in the storage. In a case where a storage amount of the log information stored in the storage has reached an upper limit when newly storing the log information generated in association with occurrence of the event, the controller deletes the log information added with the identification information from the storage, and stores the generated log information.

Further, a log information management system according to the present disclosure includes: an information processing apparatus including a requester that requests an image processing apparatus to acquire log information generated based on occurrence of an event to be audited, a storage that stores the log information acquired from the image processing apparatus, and a file outputter that outputs the log information stored in the storage, as a file; and the image processing apparatus including a controller capable of generating the log information, a storage that stores the log information, an outputter that reads and outputs the log information stored in the storage in response to an acquisition request for the log information by the information processing apparatus, and an adder that adds, to the log information, identification information indicating that the log information has been stored in the storage of the information processing apparatus. The controller stores the log information added with the identification information in the storage. In a case where a storage amount of the log information stored in the storage has reached an upper limit when newly storing the log information generated in association with occurrence of the event, the controller deletes the log information added with the identification information from the storage, and stores the generated log information.

Further, a log information management method according to the present disclosure includes: generating occurrence of an event to be audited, as log information; storing the generated log information in a storage device; reading and outputting the log information stored in the storage device in response to an acquisition request for the log information by an information processing apparatus; and adding, to the log information, identification information indicating that the log information has been stored in the information processing apparatus. The method further includes storing the log information added with the identification information in the storage device, and in a case where a storage amount of the log information stored in the storage device has reached an upper limit when newly storing the log information generated in association with occurrence of the event, deleting the log information added with the identification information from the storage device, and storing the generated log information.

According to the present disclosure, it is possible to provide an image processing apparatus and the like capable of reducing omission of saving of an audit log to be stored in an audit storage, and capable of reviewing the audit log.

BRIEF DESCRIPTION OF THE DRAWINGS

FIGS. 13A to 13C are diagrams illustrating an operation example according to the first embodiment.

FIG. 14 is a diagram illustrating a log information management system according to a second embodiment.

FIGS. 21A and 21B are diagrams illustrating an operation example according to the second embodiment.

DESCRIPTION OF THE PREFERRED EMBODIMENTS

Hereinafter, embodiments for implementing the present disclosure are described with reference to the drawings. The following embodiments are an example for describing the present disclosure, and the technical scope of the description described in the claims is not limited to the following description.

1 First Embodiment

A first embodiment is an embodiment including a controller capable of generating occurrence of an event to be audited, as log information, a storage that stores the log information, an outputter that reads and outputs the log information stored in the storage in response to an acquisition request for the log information by an information processing apparatus, and an adder that adds, to the log information, identification information indicating that the log information has been stored in the information processing apparatus. The controller stores the log information added with the identification information in the storage. In a case where the storage amount of the log information stored in the storage has reached the upper limit when newly storing the log information generated in association with occurrence of the event, the controller deletes, from the storage, the log information added with the identification information, and stores the generated log information.

1.1 Functional Configuration

1.1.1 Overall Configuration

Figure 1:
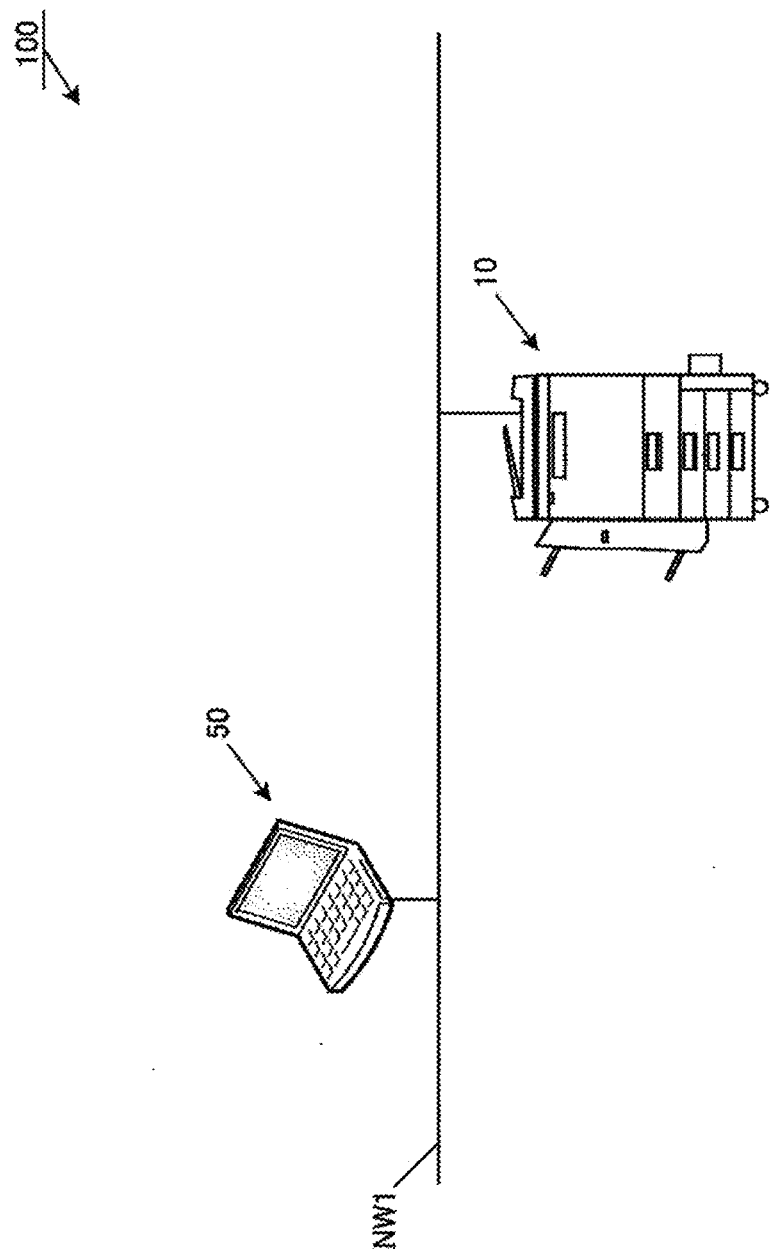
FIG. 1 is a diagram illustrating a log information management system according to a first embodiment.

FIG. 1 is a diagram schematically illustrating a configuration example of a log information management system 100 according to the first embodiment. The log information management system 100 includes a multifunction peripheral 10 as an image processing apparatus, and an information processing apparatus 50 capable of bidirectionally transmitting and receiving information to and from the multifunction peripheral 10.

The multifunction peripheral 10 and the information processing apparatus 50 are connected to each other via a network NW1 such as a local area network (LAN), a wide area network (WAN), the Internet, a telephone line, or a facsimile line. Note that, a plurality of multifunction peripherals 10 and a plurality of information processing apparatuses 50 may be connected, as long as they can be identified on the network NW1, or each of the multifunction peripheral 10 and the information processing apparatus 50 may be connected to a different network.

1.1.2 Multifunction Peripheral 10

The multifunction peripheral 10 is an image processing apparatus capable of generating occurrence of an event to be audited, as log information. Note that, in the present disclosure, the multifunction peripheral 10 is described as an example of an image processing apparatus. However, the image processing apparatus is not limited to the multifunction peripheral 10, and may be, for example, a copier, a printer, a facsimile device, or the like.

Herein, log information according to the present disclosure is an audit log for recording a security-related event (operation event) to be audited. The audit log is log information that is distinguished from a normal log that records any operation content. Separately managing an audit log and a normal log makes it easy for the administrator to recognize when, by whom, and as what kind of security-related operation, the operation to be audited has been performed. Note that, as an operation to be audited, for example "start and finish of an apparatus", "start and finish of recording an audit log", "authentication operation (PIN code authentication such as login and job input)", "user registration and deletion", "setting change (settings related to a password or network-related security)", and the like can be exemplified. The audit log is recorded in a predetermined format to facilitate understanding of the administrator. A specific content and the like of the audit log are described later.

Figure 2:
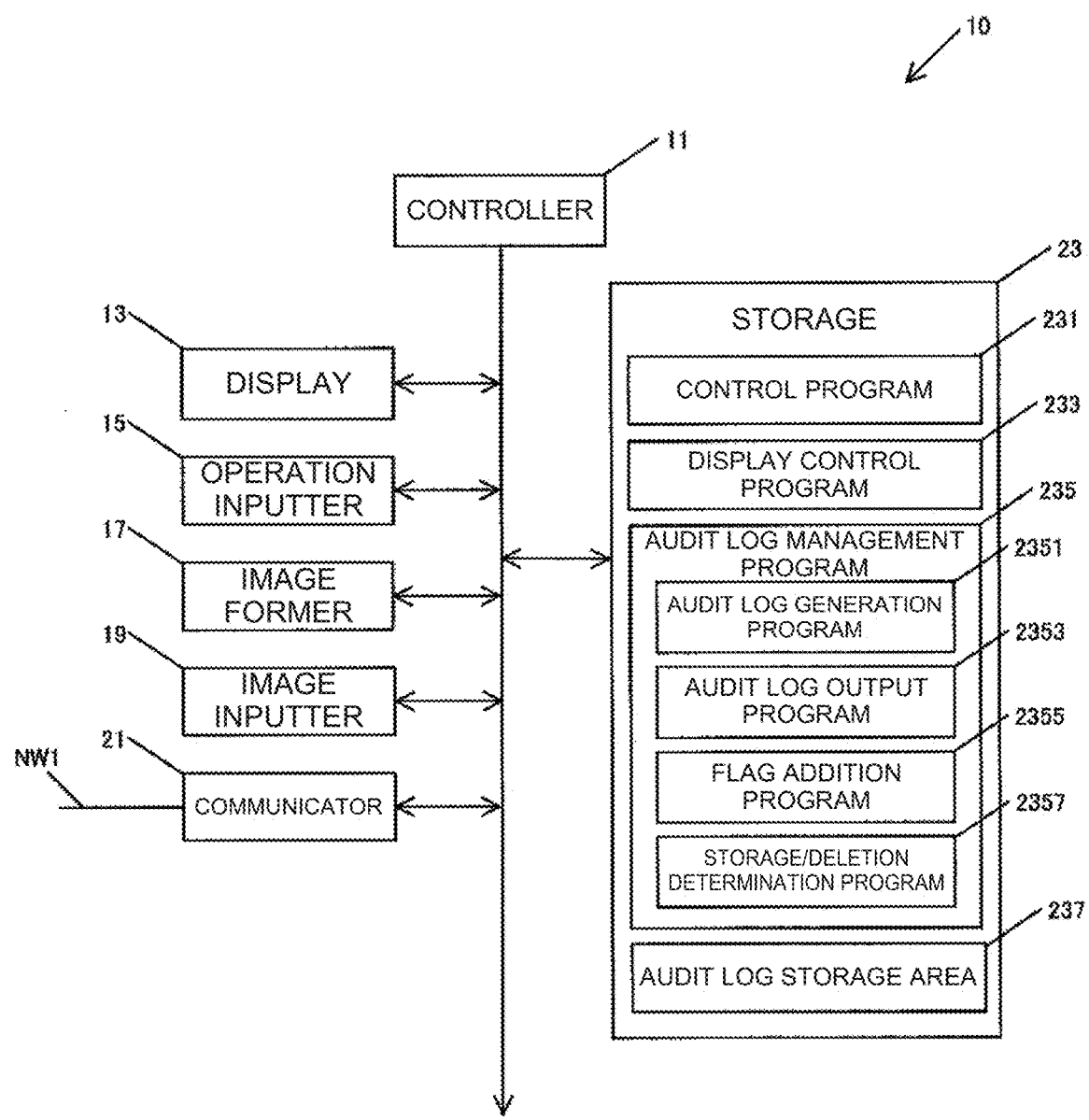
FIG. 2 is a functional configuration diagram of a multifunction peripheral according to the first embodiment.

FIG. 2 is a functional configuration diagram of the multifunction peripheral 10. The multifunction peripheral 10 includes a controller 11, a display 13, an operation inputter 15, an image former 17, an image inputter 19, a communicator 21, and a storage 23.

The controller 11 controls the entirety of the multifunction peripheral 10. The controller 11 is configured of, for example, one or more arithmetic devices (central processing units (CPUs) or the like). The controller 11 achieves each function by executing various programs stored in the storage 23.

The display 13 displays various pieces of information to a user or the like. The display 13 can be configured of, for example, a liquid crystal display (LCD), an organic electroluminescence (EL) display, a micro LED display, a mini LED display, or the like.

The operation inputter 15 receives an input of information from the user or the like. The operation inputter 15 can be configured as a touch panel display capable of an input via the display 13. In this case, as an input method to a touch panel display, for example, a resistive film method, an infrared method, an electromagnetic induction method, a capacitance method, and the like can be adopted.

The image former 17 forms an image, based on image data, on paper or the like as a recording medium. The image former 17 feeds paper from an unillustrated paper feeder, forms an image based on image data on the paper, and then discharges the paper to an unillustrated paper discharger. The image former 17 can be configured of, for example, a laser printer or the like utilizing an electrophotographic method. In this case, the image former 17 performs image formation by using toner supplied from unillustrated toner cartridges associated with toner colors (e.g., cyan, magenta, yellow, black, and the like).

The image inputter 19 includes, for example, an image sensor such as a charge coupled device (CCD) or a charge image sensor (CIS), and can be configured as a scanner device including an automatic document feeder (ADF), a flatbed for placing and reading a document, and the like. Note that, as long as the image inputter 19 includes a configuration in which image data are generated by reading a reflected light image from a document image by an image sensor, the configuration is not specifically limited. The image inputter 19 can also be configured as an interface capable of acquiring image data stored in a portable storage medium such as a universal serial bus (USB) memory, and image data transmitted from an unillustrated external device.

The communicator 21 includes, for example, either or both of a wired interface and a wireless interface for communicating with another device via the network NW1 such as a LAN, a WAN, the Internet, a telephone line, or a facsimile line.

The storage 23 stores various programs necessary for an operation of the multifunction peripheral 10, and various pieces of data. The storage 23 can be configured of a storage device such as, for example, a random access memory (RAM), a hard disk drive (HDD), a solid state drive (SSD), and a read only memory (ROM).

In the first embodiment, the storage 23 stores a control program 231, a display control program 233, and an audit log management program 235, and secures an audit log storage area 237.

The control program 231 is a program to be read by the controller 11 when controlling the multifunction peripheral 10. The controller 11 that has read the control program 231 integrally controls the multifunction peripheral 10. Further, the controller 11 that has read the control program 231 controls the display 13, the operation inputter 15, the image former 17, the image inputter 19, the communicator 21, and the like, thereby performing processing related to each execution mode such as printing, copying, scanning, faxing, and Internet faxing in units of jobs.

The display control program 233 is a program to be read by the controller 11 when controlling a display screen to be displayed via the display 13. The controller 11 that has read the display control program 233 displays a home screen for receiving switching of an execution mode of a job or the like, a setting screen for receiving an input of various setting values related to execution of a job or the like. In addition, the controller 11 that has read the display control program 233 functions as a setter, and displays various screens (e.g., an apparatus activation screen, an audit log recording start/finish reception screen, an authentication screen, a user registration/deletion screen, a security-related setting screen, a setting screen for setting a priority of a deletion candidate audit log, and the like) related to an event to be audited.

The audit log management program 235 is a program to be read by the controller 11 when managing an audit log. The audit log management program 235 includes an audit log generation program 2351, an audit log output program 2353, a flag addition program 2355, and a storage/deletion determination program 2357. The controller 11 that has read these programs controls generation of an audit log, output of an audit log to the information processing apparatus 50, addition of a saved flag as identification information to an audit log, storage/deletion of an audit log, and the like.

In the present disclosure, an action of outputting an audit log via a Web page or the like, based on a storage instruction by the controller 11, and storing an audit log output to a storage area of an apparatus different from the multifunction peripheral 10, such as the information processing apparatus 50, is referred to as "storage". Further, a saved flag according to the present disclosure is identification information indicating that an audit log has been stored in a storage area of an apparatus different from the multifunction peripheral 10.

The controller 11 that has read the audit log generation program 2351 monitors whether an event to be audited has occurred. The controller 11 generates an audit log, in a case where occurrence of an event to be audited is detected.

The controller 11 that has read the audit log output program 2353 functions as an outputter, and in a case where an acquisition request for an audit log is received from the information processing apparatus 50, the controller 11 reads an audit log stored in the audit log storage area 237, and outputs the audit log to the information processing apparatus 50. The audit log output program 2353 can be configured as, for example, a Web application capable of providing a service via a Web browser of the information processing apparatus 50.

The controller 11 that has read the flag addition program 2355 functions as an adder. The controller 11 adds a saved flag to an audit log corresponding to an audit log output to the information processing apparatus 50, based on an acquisition request for an audit log received from the information processing apparatus 50. The audit log added with the saved flag becomes a deletion target audit log to be deleted from the audit log storage area 237, in a case where the storage amount of audit logs to be stored in the audit log storage area 237 has reached the upper limit.

In a case where the storage amount of audit logs to be stored in the audit log storage area 237 has reached the upper limit, the controller 11 that has read the storage/deletion determination program 2357 determines a deletion target audit log to be deleted from the audit log storage area 237, for example, based on the storage date and time of an audit log added with a saved flag, the number of times of addition of a save flag, and the like. In this case, an audit log in which the storage date and time is old, or the number of times of addition of a save flag is large can be preferentially determined as a deletion target audit log. Then, the controller 11 deletes the audit log determined as a deletion target from the audit log storage area 237, and stores a new audit log generated in association with occurrence of an event to be audited.

The audit log storage area 237 is a storage area capable of storing an audit log, based on a storage instruction from the controller 11, and deleting an audit log, based on a deletion instruction from the controller 11. Herein, a storage content of an audit log according to the present disclosure is described.

In the audit log according to the present disclosure, since predetermined contents are recorded in order, based on a predetermined format, the administrator can easily recognize an operation content. As the predetermined format, for example, a format in which the following items are recorded in one line with a space as a delimiter can be adopted.

Log ID
  Operation content (event name)
    Operation of security-related event
      Authentication (such as login operation), user registration or deletion, event such as change of settings
    Operation execution time (event occurrence date and time)
    Operation device (operation UF)
      Operation (OPE) screen, Web page, other networks
  Name (login name) of user who has made change
  Operation result (success/failure, or the like)
  Other information (in a case where an operation result is a failure, a reason for the failure is recorded, or the like)

Note that, in items of other information, for example, in a case where an operation result has failed, it is possible to record any content such as for what reason the failure has occurred, or which item has been changed to which value, in a case where setting change has been made.

Herein, a specific example of an audit log recorded in accordance with the above-described predetermined format is described. For example, the audit log illustrated in the dotted frame in FIG. 13A indicates, as an event to be audited, an example of an audit log recorded when a login operation to the multifunction peripheral 10 has been detected. The audit log (log ID "846") is an audit log in which an occurring event to be audited is "Login Terminated" (login operation has timed out), and indicates that the event has occurred at "2022-05-10T11:15:48 (+09:00)". The operation device at this occasion is a "Web" page, and the user who has operated is "admin" (administrator). Further, a result of the event is "N/A" (invalid), and a reason for invalidation is "Timeout" (has timed out).

As illustrated in FIG. 13A, since the audit log according to the present disclosure includes a configuration in which predetermined contents are recorded in order, based on a predetermined format, the administrator can easily recognize a content of an event that has occurred.

1.1.3 Information Processing Apparatus 50

The information processing apparatus 50 is assumed to be an information processing apparatus to be mainly used by the administrator who reviews an audit log. The information processing apparatus 50 is an information processing apparatus capable of transmitting an acquisition request for an audit log to the multifunction peripheral 10, displaying the acquired audit log for review, outputting a file in a predetermined file format, and the like.

Figure 3:
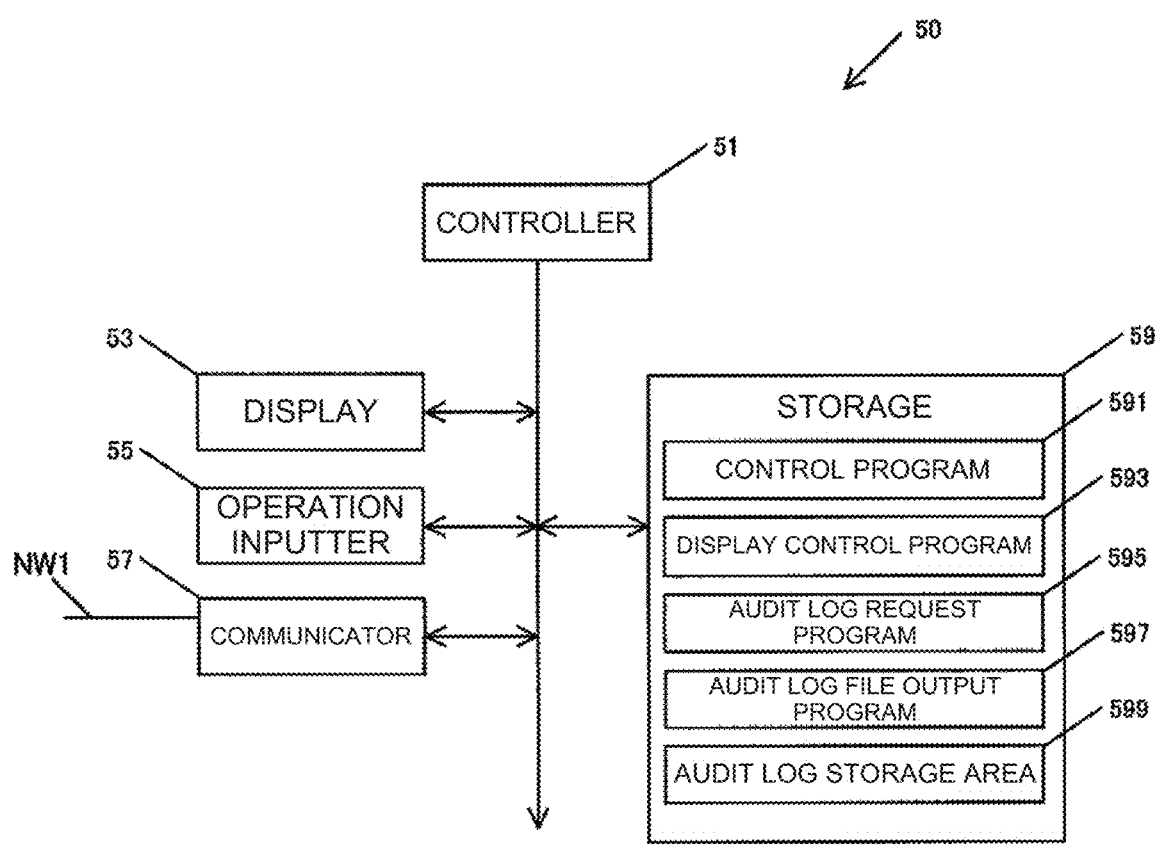
FIG. 3 is a functional configuration diagram of an information processing apparatus according to the first embodiment.

FIG. 3 is a functional configuration diagram of the information processing apparatus 50. The information processing apparatus 50 includes a controller 51, a display 53, an operation inputter 55, a communicator 57, and a storage 59.

The controller 51 controls the entirety of the information processing apparatus 50. The controller 51 can be configured of, for example, one or a plurality of arithmetic devices (CPUs or the like). The controller 51 achieves each function by reading and executing various programs stored in the storage 59.

The display 53 displays various pieces of information to the user or the like. The display 53 can be configured of, for example, an LCD, an organic EL display, a micro LED display, a mini LED display, or the like.

The operation inputter 55 receives an input of information from the user or the like. The operation inputter 55 can be configured of, for example, an input device such as a keyboard, a mouse, or a touch panel.

The communicator 57 includes, for example, one or both of a wired interface and a wireless interface for communicating with another device via the network NW1 such as a LAN, a WAN, the Internet, a telephone line, or a facsimile line.

The storage 59 stores various programs necessary for an operation of the information processing apparatus 50, and various pieces of data. The storage 59 can be configured of, for example, a storage device such as a RAM, an HDD, an SSD, or a ROM.

In the first embodiment, the storage 59 stores a control program 591, a display control program 593, an audit log request program 595, and an audit log file output program 597, and secures an audit log storage area 599.

The control program 591 is a program to be read by the controller 51 when controlling the information processing apparatus 50. The controller 51 that has read the control program 591 integrally controls the information processing apparatus 50.

The display control program 593 is a program to be read by the controller 51 when controlling a display screen to be displayed via the display 53. The controller 51 that has read the display control program 593 displays, for example, a reception screen for receiving an acquisition request for an audit log, a review screen for reviewing the acquired audit log, an output screen for outputting the audit log, as a file, and the like, in addition to a normal operation screen of the information processing apparatus 50. Further, the controller 51 that has read the display control program 593 can also display screen information on the display 53, by acquiring, from the multifunction peripheral 10, the screen information related to various screens (e.g., an apparatus activation screen, an audit log recording start/finish reception screen, an authentication screen, a user registration/deletion screen, a security-related setting screen, a setting screen for setting a priority of a deletion candidate audit log, and the like) related to an event to be audited and displayed by the multifunction peripheral 10.

The audit log request program 595 is a program to be read by the controller 51 when making an audit log acquisition request to the multifunction peripheral 10. The controller 51 that has read the audit log request program 595 functions as a requester, and upon receiving an audit log acquisition request instruction from the administrator, the controller 51 transmits an audit log acquisition request to the multifunction peripheral 10. Note that, the audit log request program 595 can be configured as a browser application having some functions of the display control program 593, or can be configured as a native application to be installed and used in the information processing apparatus 50.

The audit log file output program 597 is a program to be read by the controller 51 when outputting an audit log, as a file in a predetermined file format. The controller 51 that has read the audit log file output program 597 functions as a file outputter, and outputs an audit log acquired from the multifunction peripheral 10, as a file in a text format, a CSV format, or the like.

The audit log storage area 599 is a storage area capable of storing an audit log acquired from the multifunction peripheral 10.

1.2 Flow of Processing

1.2.1 Overall Processing

Figure 4:
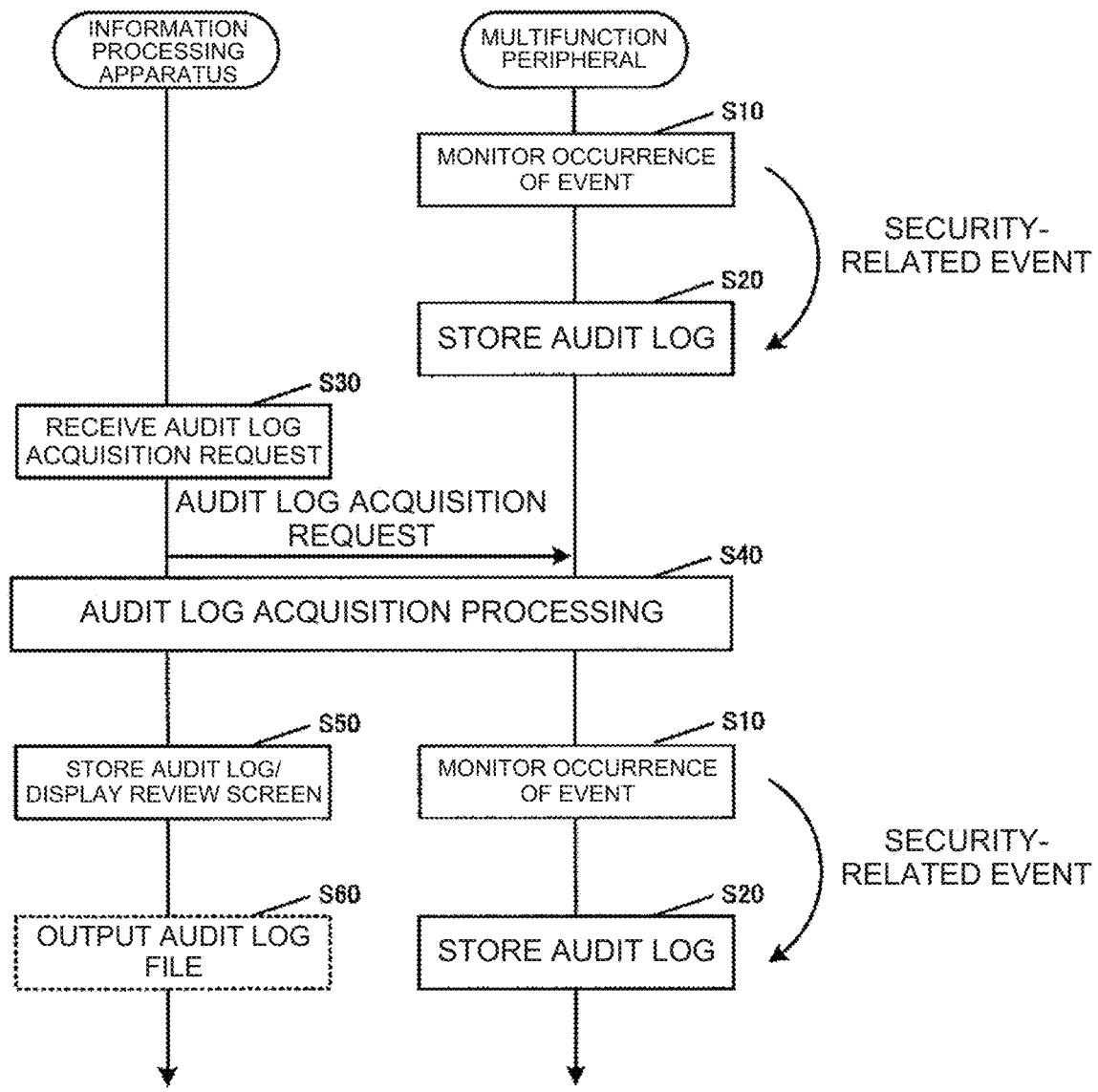
FIG. 4 is a sequence diagram illustrating overall processing according to the first embodiment.

Next, a flow of processing according to the first embodiment is described. FIG. 4 is a sequence diagram illustrating overall processing according to the first embodiment.

The controller 11 of the multifunction peripheral 10 monitors occurrence of an event (step S10). In a case where an event has occurred, and the occurring event is a security-related event to be audited, the controller 11 generates an audit log, and stores the audit log in the audit log storage area 237 (step S20).

When the controller 51 of the information processing apparatus 50 receives an audit log acquisition request instruction from the administrator, the controller 51 makes an audit log acquisition request to the multifunction peripheral 10 (step S30).

Then, the controller 51 of the information processing apparatus 50 acquires an audit log output from the multifunction peripheral 10 (step S40). At this occasion, the multifunction peripheral 10 performs processing illustrated in FIG. 7, as processing of outputting an audit log.

After acquiring an audit log from the multifunction peripheral 10, the controller 51 of the information processing apparatus 50 stores the acquired audit log in the audit log storage area 599. Further, the controller 51 displays, on the review screen, the audit log stored in the audit log storage area 599 as necessary (step S50). In a case where the controller 51 receives an instruction to output the audit log, as a file, the controller 51 outputs the audit log in a predetermined file format (step S60).

On the other hand, after outputting the audit log, the multifunction peripheral 10 continuously performs processing of monitoring occurrence of an event in step S10, and storing an audit log in step S20.

1.2.2 Processing of Multifunction Peripheral 10

Figure 5:
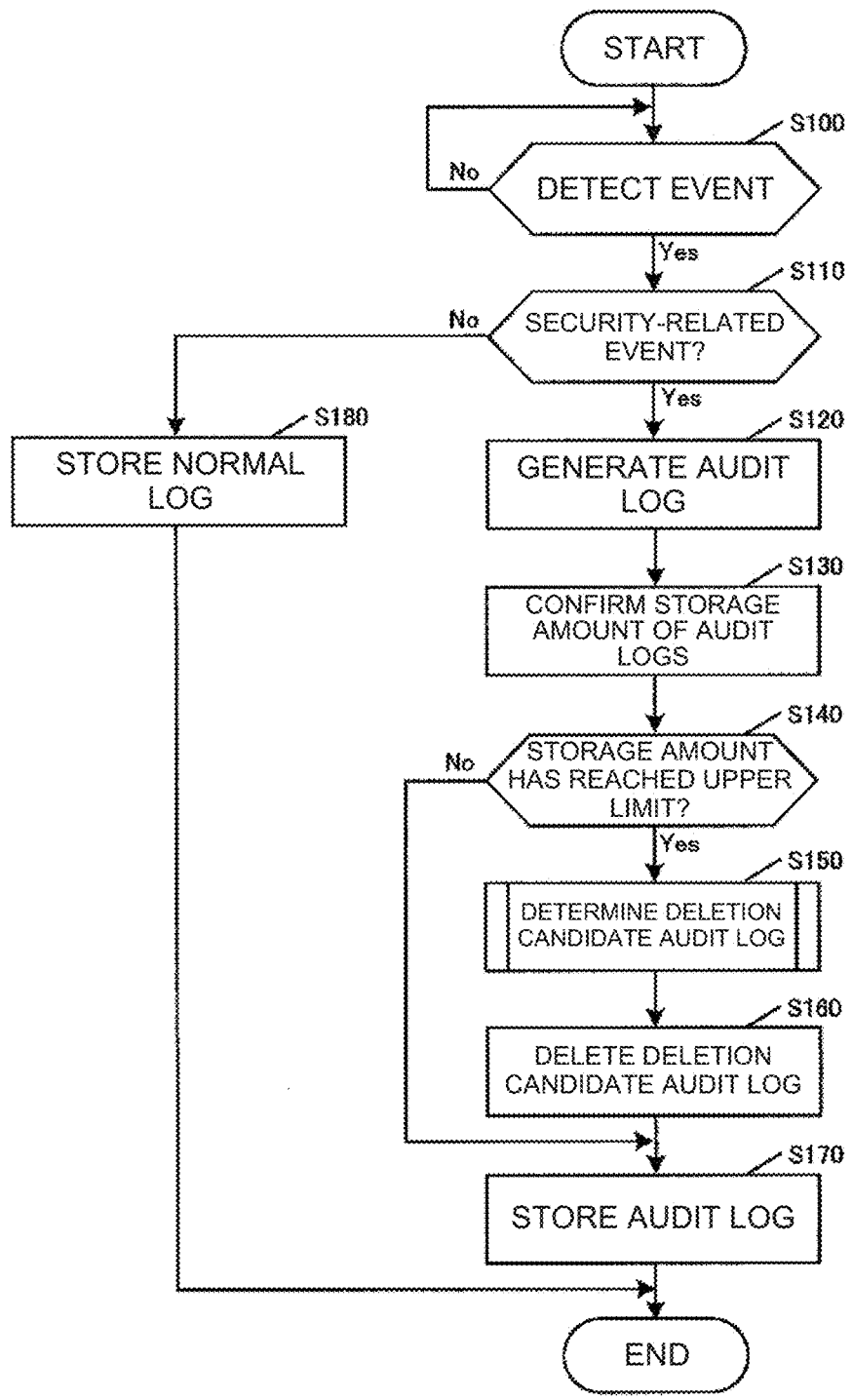
FIG. 5 is a flowchart illustrating a flow of processing according to the first embodiment.

Next, processing to be performed by the multifunction peripheral 10 is described. FIG. 5 is a flowchart illustrating processing of monitoring occurrence of an event in step S10, and storing an audit log in step S20 in FIG. 4. The processing described herein is processing to be performed by mainly reading the audit log management program 235 (the audit log generation program 2351, the audit log output program 2353, the flag addition program 2355, and the storage/deletion determination program 2357) by the controller 11 of the multifunction peripheral 10.

The controller 11 monitors occurrence of an event, and determines whether occurrence of an event has been detected (step S100). In a case where it is determined that occurrence of an event has been detected, the controller 11 determines whether the detected event is a security-related event to be audited (step S100; Yes→step S110). Note that, in a case where occurrence of an event has not been detected, the controller 11 continues monitoring until occurrence of an event is detected (step S100; No).

In a case where it is determined that the detected event is a security-related event to be audited, the controller 11 generates an audit log for the event (step S110; Yes→step S120). Subsequently, the controller 11 confirms the storage amount of audit logs in the audit log storage area 237 (step S130). The controller 11 determines whether the storage amount of audit logs has reached the upper limit of the audit log storage area 237 (step S140).

In a case where it is determined that the storage amount of audit logs has reached the upper limit of the audit log storage area 237, the controller 11 determines an audit log (hereinafter, also referred to as a deletion candidate audit log) added with a saved flag to be deleted from the audit log storage area 237, based on the addition date and time, the number of times of addition of a saved flag, and the like (step S140; Yes→step S150). The controller 11 deletes the determined deletion candidate audit log from the audit log storage area 237 (step S160).

Subsequently, the controller 11 stores the new audit log generated in step S120 in the audit log storage area 237, and finishes the processing (step S170).

On the other hand, in a case where it is determined that the storage amount of audit logs has not reached the upper limit of the audit log storage area 237, the controller 11 skips pieces of processing in Step S150 and Step S160, stores the generated new audit log in the audit log storage area 237, and finishes the processing (step S140; No→step S170).

In a case where it is determined that the detected event is not a security-related event to be audited, the controller 11 determines that the detected event is an event related to a normal operation. Then, the controller 11 generates a normal log related to the normal operation, stores the generated normal log in an unillustrated storage area of the storage 23, and finishes the processing (step S110; No→step S180).

Figure 6:
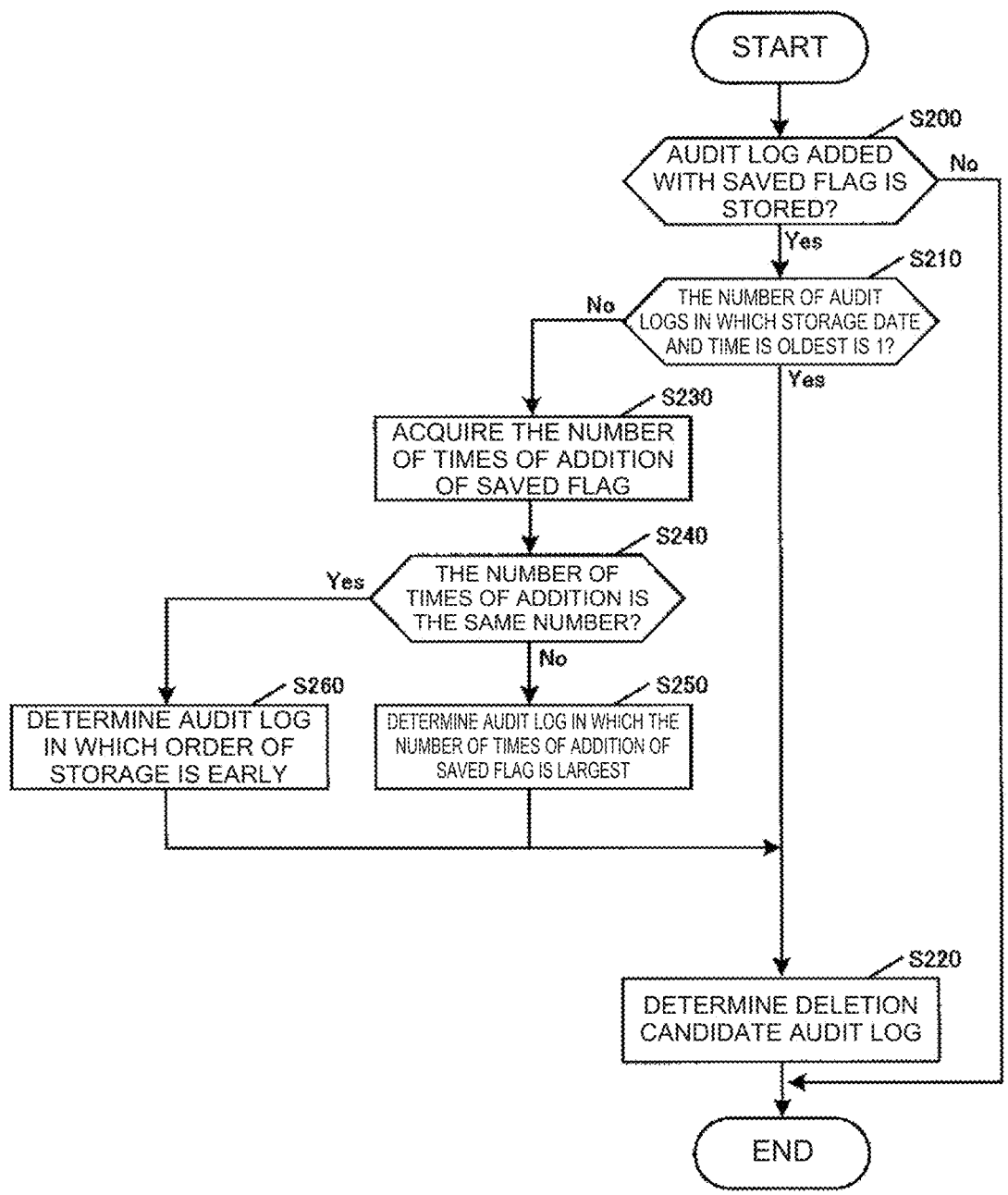
FIG. 6 is a flowchart illustrating a flow of processing according to the first embodiment.

Next, processing of determining a deletion candidate audit log in step S150 in FIG. 5 is described with reference to a flowchart in FIG. 6.

First, the controller 11 determines whether an audit log added with a saved flag is stored in the audit log storage area 237 (step S200). In a case where it is determined that an audit log added with a saved flag is stored in the audit log storage area 237, the controller 11 determines whether the number of audit logs added with a saved flag in which the storage date and time is oldest is one (step S200; Yes→step S210). In a case where it is determined that an audit log added a saved flag is not stored in the audit log storage area 237, the controller 11 finishes the processing (step S200; No). Note that, in a case where an audit log added with a saved flag is not stored in the audit log storage area 237, the controller 11 may determine an audit log in which the storage date and time is oldest among the audit logs, as a deletion candidate audit log.

In a case where it is determined that the number of audit logs added with a saved flag in which the storage date and time is oldest is one, the controller 11 determines the audit log added with a saved flag, as the deletion candidate audit log, and finishes the processing (step S210; Yes→step S220).

On the other hand, in a case where it is determined that the number of audit logs added with a saved flag in which the storage date and time is oldest is not one, the controller 11 acquires the number of times of addition of a saved flag (step S210; No→step S230). Then, the controller 11 compares the acquired number of times of addition of a saved flag, and determines whether the number of times of addition is the same number (step S240).

In a case where it is determined that the number of times of times of addition of a saved flag is the same number, the controller 11 determines the audit log added with a saved flag in which the storage order is early (step S240; Yes→step S260). Then, the controller 11 determines the determined audit log added with a saved flag, as a deletion candidate audit log, and finishes the processing (step S220).

On the other hand, in a case where it is determined that the number of times of addition of a saved flag is not the same number, the controller 11 determines an audit log added with a saved flag in which the number of times of addition of a saved flag is largest (step S240; No→step S250). Then, the controller 11 determines the determined audit log added with a saved flag, as a deletion candidate audit log, and finishes the processing (step S220).

Figure 7:
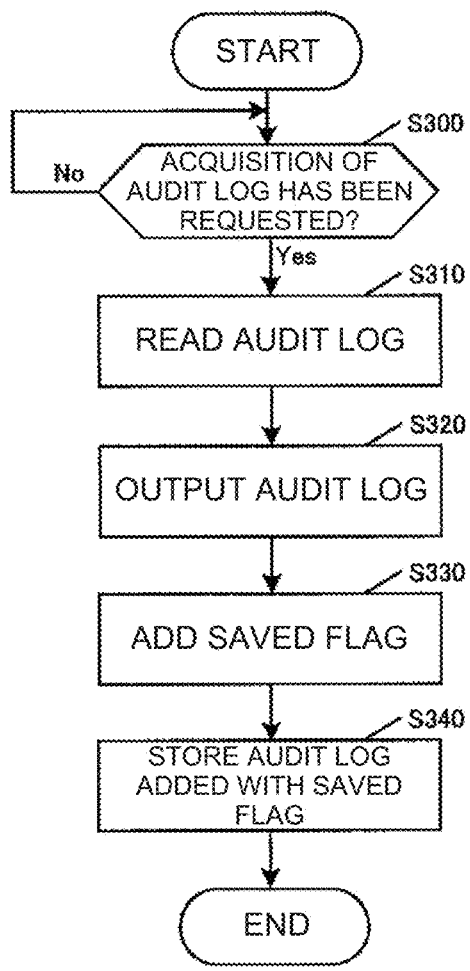
FIG. 7 is a flowchart illustrating a flow of processing according to the first embodiment.

FIG. 7 is a flowchart illustrating processing on the side of the multifunction peripheral 10, regarding audit log acquisition processing in step S40 in FIG. 4.

The controller 11 determines whether an audit log acquisition request has been received from the information processing apparatus 50 (step S300). In a case where it is determined that an audit log acquisition request has been received from the information processing apparatus 50, the controller 11 reads an audit log stored in the audit log storage area 237 (step S300; Yes→step S310). Note that, in a case where it is determined that an audit log acquisition request has not been received from the information processing apparatus the controller 11 waits until an audit log acquisition request is received (step S300; No).

Then, the controller 11 outputs the audit log read from the audit log storage area 237 to the information processing apparatus 50 (step S320).

Subsequently, the controller 11 adds a saved flag to the output audit log (step S330), and stores the audit log added with the saved flag in the audit log storage area 237 (step S340).

Note that, in a case where the controller 11 has read the audit log added with a saved flag in step S310, the controller 11 stores a value acquired by incrementing the number of times of addition of a saved flag in association with the audit log added with the saved flag without newly adding a saved flag in step S340.

1.2.3 Processing of Information Processing Apparatus 50

Figure 8:
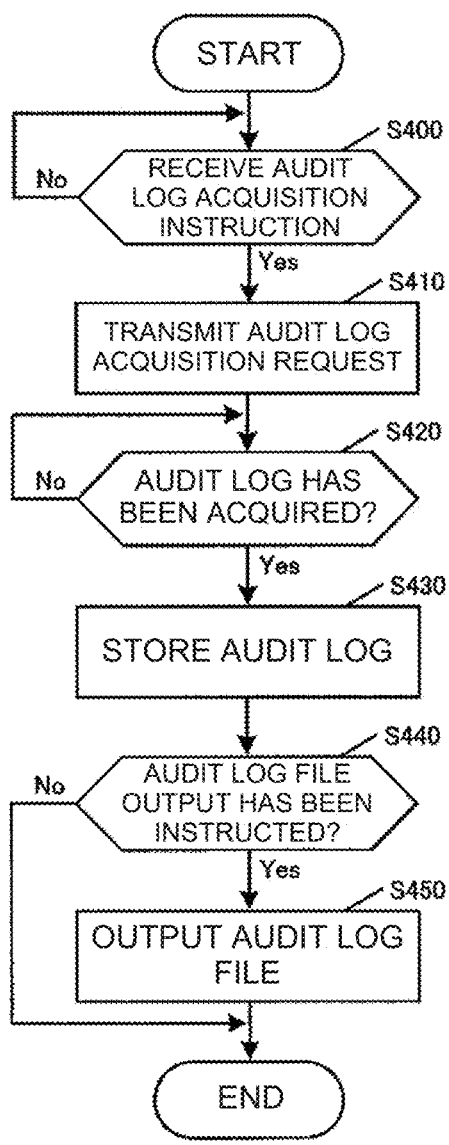
FIG. 8 is a flowchart illustrating a flow of processing according to the first embodiment.

Next, processing to be performed by the information processing apparatus 50 is described. FIG. 8 is a flowchart illustrating processing from receiving an audit log acquisition request in step S30 to outputting an audit log file in step S60 in FIG. 4. The processing described herein is processing to be performed by mainly reading the audit log request program 595, the audit log file output program 597, and the like by the controller 51 of the information processing apparatus 50.

The controller 51 determines whether an audit log acquisition request instruction has been received from the administrator via an audit log operation screen of a Web page to be described later (step S400). In a case where it is determined that an audit log acquisition request instruction has been received, the controller 51 transmits an audit log acquisition request to the multifunction peripheral 10 (step S400; Yes→step S410). Note that, in a case where it is determined that an audit log acquisition request instruction has not been received, the controller 51 waits until receiving the acquisition request instruction (step S400; No).

Subsequently, the controller 51 determines whether an audit log has been acquired from the multifunction peripheral 10 (step S420). In a case where it is determined that an audit log has been acquired by downloading or the like from the multifunction peripheral 10, the controller 51 stores the acquired audit log in the audit log storage area 599 of the information processing apparatus 50 (step S420; Yes→step S430). Note that, in a case where it is determined that an audit log has not been acquired, the controller 51 waits until acquiring the audit log (step S420; No).

Then, the controller 51 determines whether an output request for an audit log as a file has been received (step S440). In a case where it is determined that an output request for an audit log as a file has been received, the controller 51 outputs the audit log in a predetermined file format, and finishes the processing (step S440; Yes→step S450). On the other hand, in a case where it is determined that an output request for an audit log as a file has not been received, the controller 51 finishes the processing (step S440; No).

1.3 Operation Example

Figure 9:
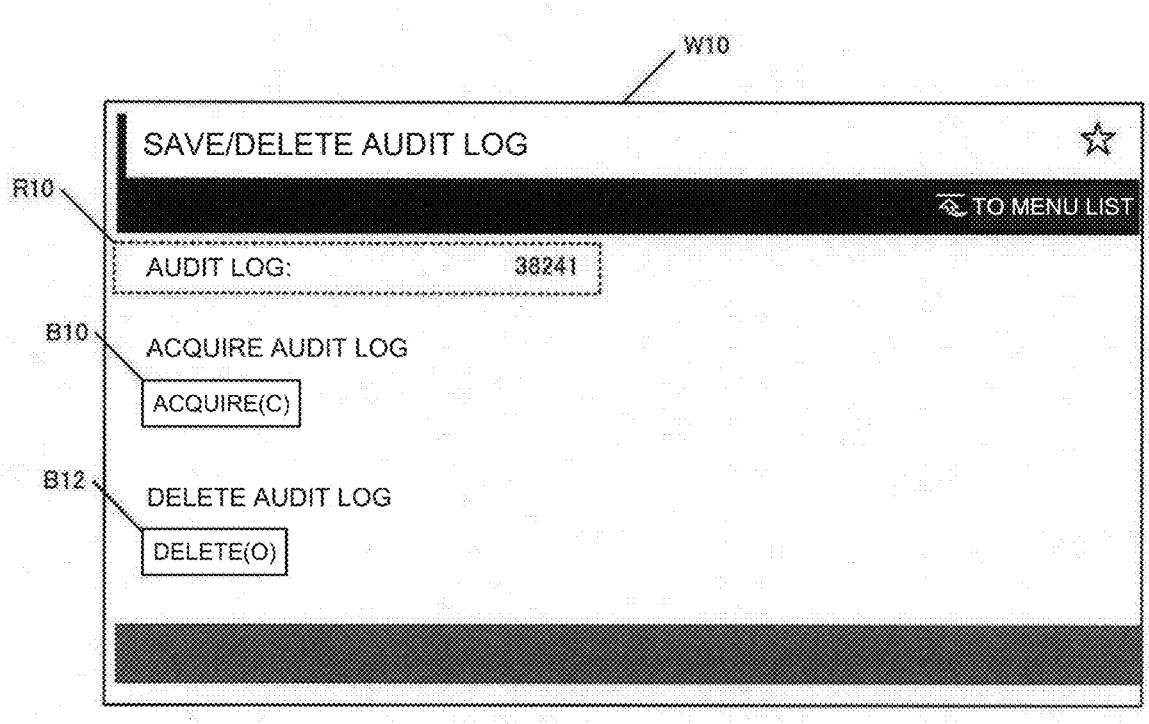
FIG. 9 is a diagram illustrating an operation example according to the first embodiment.

Next, an operation example according to the first embodiment is described. FIG. 9 is a diagram illustrating a configuration example of an audit log operation screen W10 for receiving an audit log acquisition request instruction from the user. The audit log operation screen W10 can be displayed, for example, by reading a browser application as the audit log request program 595, and using a Web service to be provided by the multifunction peripheral by the controller 51 of the information processing apparatus 50.

The audit log operation screen W10 includes an audit log accumulated number display area R10, an audit log acquisition request button B10, and an audit log deletion request button B12.

The audit log accumulated number display area R10 is a display area for displaying the accumulated number of audit logs to be stored in the audit log storage area 237 by the multifunction peripheral 10. FIG. 9 illustrates that the audit log "38241" is stored in the audit log storage area 237 of the multifunction peripheral 10.

The audit log acquisition request button B10 is an operation button for receiving an audit log acquisition request instruction. When the audit log acquisition request button B10 is selected by the user, the controller 51 transmits an audit log acquisition request to the multifunction peripheral 10.

The audit log deletion request button B12 is an operation button for receiving an audit log deletion request. When the audit log deletion request button B12 is selected by the user, the controller 51 transmits an audit log deletion request to the multifunction peripheral 10.

Figure 10:
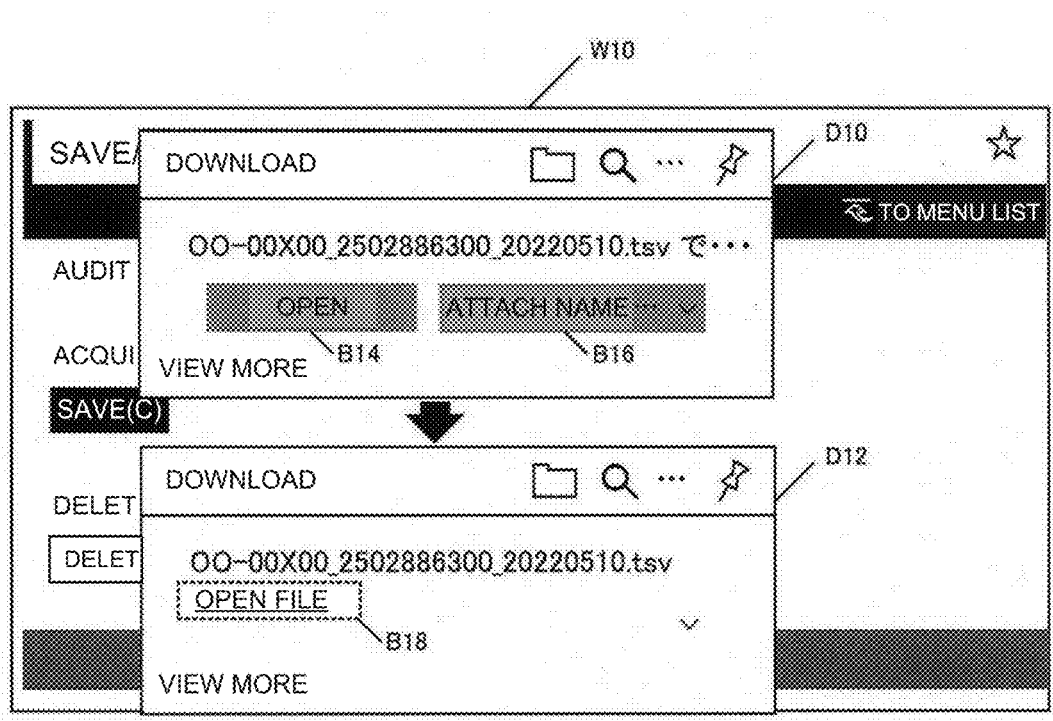
FIG. 10 is a diagram illustrating an operation example according to the first embodiment.

FIG. 10 is a diagram illustrating a configuration example of a download confirmation dialog D10 to be displayed upon receiving selection of the audit log acquisition request button B10 on the audit log operation screen W10 in FIG. 9. The download confirmation dialog D10 includes an open button B14, and a naming and storage button B16.

The open button B14 is an operation button for storing an audit log (list) to be acquired, for example, "oo-00X00_2502886300, 20220510.tsv" in the audit log storage area 599, and receiving an instruction to display the audit log, after downloading the audit log to the information processing apparatus 50. In this case, for example, the user can select an audit log to be acquired via an unillustrated audit log selection screen to be displayed in response to selection of the audit log acquisition request button B10.

The naming and storage button B16 is an operation button for receiving an instruction to store an audit log (list) to be acquired, for example, "oo-00X00_2502886300, 20220510.tsv" in the audit log storage area 599 with a different name, after downloading the audit log to the information processing apparatus 50. Note that, the controller 51 may separately display a selection screen for receiving change/selection of a storage (output) format of an audit log to be acquired in response to selection of the naming and storage button B16.

When one of the storage methods of the open button B14, and the naming and storage button B16 is selected, download of the audit log "oo-2502886300_20220510.tsv" to be stored is started, and when download of the file is completed, the controller 51 displays a download completion dialog D12. The download completion dialog D12 is provided with a file opening button B18. The file opening button B18 is an operation button for receiving an instruction to display a downloaded audit log.

Figure 11:
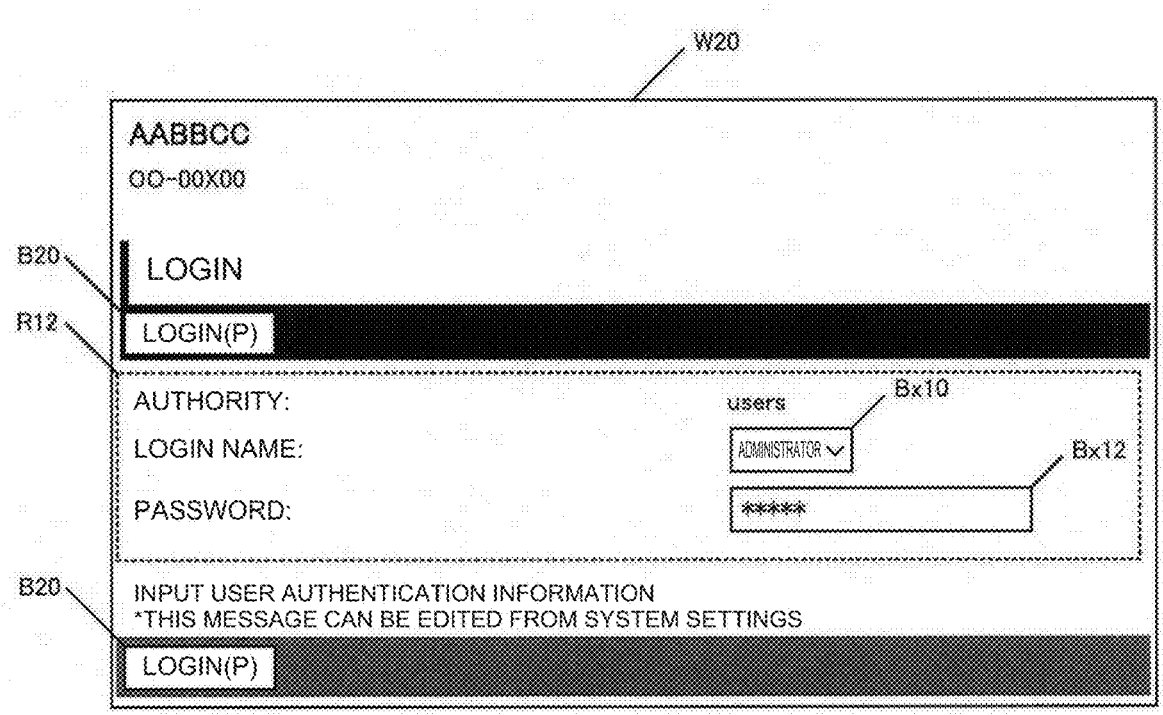
FIG. 11 is a diagram illustrating an operation example according to the first embodiment.

Next, an operation related to generation of an audit log in association with occurrence of an event, and storage of the audit log in the audit log storage area 237 is described. FIG. 11 is a diagram illustrating a configuration example of a login authentication screen W20 for receiving login authentication of the user (administrator) to the multifunction peripheral 10. The login authentication screen W20 can be displayed via a Web page to be provided by the multifunction peripheral 10 for the information processing apparatus 50 or unillustrated another information processing apparatus, including a configuration in which the screen W20 is displayed on the display 13 of the multifunction peripheral 10. The multifunction peripheral 10 authenticates the user (administrator), based on authentication information input via the login authentication screen W20.

Login authentication is included in an event to be audited. Therefore, when the controller 11 detects an event (operation event) related to login authentication, the controller 11 performs an operation of generating an audit log related to the login authentication, and storing the audit log in the audit log storage area 237.

The login authentication screen W20 includes a login button B20, and an authentication information input area R12. The login button B20 is an operation button for receiving an instruction to perform an authentication operation based on authentication information input to the authentication information input area R12. When the login button B20 is selected by the user, the controller 11 performs an authentication operation.

The authentication information input area R12 is an input area including a login name input box Bx10, and a password input box Bx12, and receives an input of authentication information by the user. The login name input box Bx10 is an input box for receiving an input of a login name of the user who tries to log in to the multifunction peripheral 10. Note that, FIG. 11 is an example in which the login name input box Bx10 is configured of a pull-down menu that enables selection of a login name of an administrator, a registered user, or the like, but the login name input box Bx10 may be configured to directly input a login name. The password input box Bx12 is an input box for receiving an input of a login password associated with a login name of the user who tries to log in to the multifunction peripheral 10.

Login authentication may be performed by, in addition to knowledge authentication by combination of a login name and a login password via the login authentication screen W20, property authentication using an identity/identification card (ID) card such as an integrated circuit (IC) card or a magnetic card, a mobile phone, a smartphone, or the like, biometric authentication such as fingerprint authentication or face authentication, or the like. When the controller 11 detects an event related to login authentication, based on an adopted login authentication method, the controller 11 performs an operation of generating an audit log related to the login authentication, and storing the audit log in the audit log storage area 237.

Figure 12:
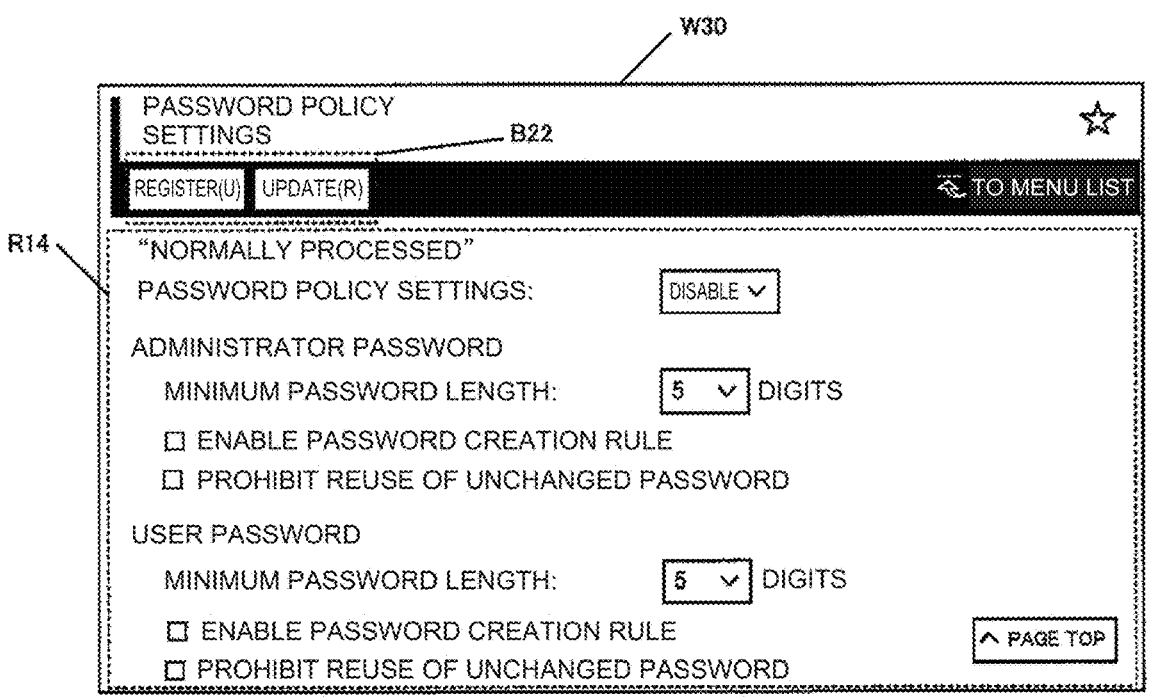
FIG. 12 is a diagram illustrating an operation example according to the first embodiment.

FIG. 12 is a diagram illustrating a configuration example of a password policy setting screen W30. The password policy setting screen W30 is a setting screen for receiving settings/change of a password policy to be applied to a login password or the like. Settings/change (settings related to a password or network-related security) are included in an event to be audited. Therefore, when the controller 11 detects an event (operation event) related to settings/change of a password or the like, the controller 11 performs an operation of generating an audit log related to the settings/change, and storing the audit log in the audit log storage area 237.

The password policy setting screen W30 includes a registration/update button B22, and a password policy setting area R14. The registration/update button B22 is an operation button for receiving an execution instruction to register or update a password policy, based on a setting content in the password policy setting area R14. The password policy setting area R14 is, for example, a setting area including a setting item for receiving presence or absence of password policy application, settings/change of a password policy (such as a minimum password length, a password creation rule, and prohibition of reuse of a password). The user can make settings/change of a password policy by making settings/change necessary for the password policy setting area R14, and selecting the registration/update button B22. When the controller 11 detects an event (operation event) related to settings/change of a password policy, the controller 11 performs an operation of generating an audit log related to the settings/change, and storing the audit log in the audit log storage area 237.

FIGS. 13A to 13C are diagrams illustrating an operation of storing an audit log generated based on occurrence of an event to be audited, which is illustrated in FIG. 11, FIG. 12, and the like. FIGS. 13A to 13C are diagrams in which a list of audit logs is arranged in chronological order ((a)→(b)→(c)), and are diagrams illustrating a state of deletion/storage of audit logs.

FIG. 13A is an example in which audit logs from the log ID "5" to the log ID "847" are displayed as a list, and the audit log having the log ID "5" indicates an audit log in which the storage date and time is oldest ("2022-04-19T16:39 (+09:00)"). Herein, a star mark (*) in FIG. 13A indicates a saved flag F10. Further, the number "5" indicated by a one-dot chain line in FIG. 13A indicates the number N10 of times of addition of the saved flag F10. Specifically, the audit log having the log ID "5" indicates that a saved flag is added five times.

Herein, for example, it is assumed that an event of an audit log having the log ID "848" indicated by a two-dot chain line in FIG. 13C has occurred (setting change related to password change). Since an event of the audit log having the log ID "848" is setting change related to password change, the event is included in an event to be audited. In this case, the controller 11 determines whether the storage amount of audit logs in the audit log storage area 237 has reached the upper limit (equivalent to the processing of step S140 in FIG. 5) to store the audit log having the log ID "848". Then, in a case where it is determined that the storage amount of audit logs has reached the upper limit, the controller 11 deletes a deletion candidate audit log. In the example illustrated in FIG. 13A, the audit log having the log ID "5" is an audit log to which a saved flag is added five times, and in which the storage date and time is oldest. Therefore, the controller 11 determines the audit log, as a deletion candidate audit log (corresponding to the processing of step S210; Yes in FIG. 6).

FIG. 13B illustrates a result acquired by determining the audit log having the log ID "5", as a deletion candidate audit log, and deleting the audit log. In order to indicate that the audit log having the log ID "5" has been deleted, the audit log is crossed out with two lines.

FIG. 13C illustrates a state in which the audit log having the log ID "848" is stored in a free space generated by deletion of the audit log having the log ID "5". In a case where it is determined that the storage amount of audit logs has not reached the upper limit, the controller 11 stores the audit log having the log ID "848" without deleting the audit log having the log ID "5".

As described above, according to the first embodiment, in a case where the storage amount of audit logs stored in the storage has reached the upper limit when newly storing an audit log generated in association with occurrence of an event to be audited, log information added with identification information is deleted from the storage, and the generated log information is stored. Therefore, the information processing apparatus can reduce omission of saving of an audit log to be stored in an audit storage in a multifunction peripheral, and can review the audit log.

2 Second Embodiment

A second embodiment is an embodiment in which, in addition to the configuration of the first embodiment, an audit log to be stored is read and output based on a set schedule. In the second embodiment, in addition to addition of a saved flag according to the first embodiment, a transmitted flag as second identification information is added to an output audit log. Further, in a case where the storage amount of audit logs has reached the upper limit, a controller of a multifunction peripheral determines a deletion target audit log according to an addition status of a saved flag and/or a transmitted flag.

2.1 Functional Configuration

2.1.1 Overall Configuration

FIG. 14 is a diagram schematically illustrating a configuration of a log information management system 200 according to the second embodiment. The log information management system 200 includes a server apparatus 70, in addition to a configuration of a multifunction peripheral 90 and an information processing apparatus 50.

The server apparatus 70 is connected to a network NW1 via a network NW2 such as a LAN, a WAN, or the Internet. The server apparatus 70 is connected in such a way that the multifunction peripheral 90 and the information processing apparatus 50 can bi-directionally transmit and receive information via the network NW2 and the network NW1. Note that, FIG. 14 is an example of a configuration in which the server apparatus 70 is connected to the network NW2, but the server apparatus 70 may be connected to the network NW1, and a plurality of server apparatuses 70 may be connected.

2.1.2 Multifunction Peripheral 90

Figure 15:
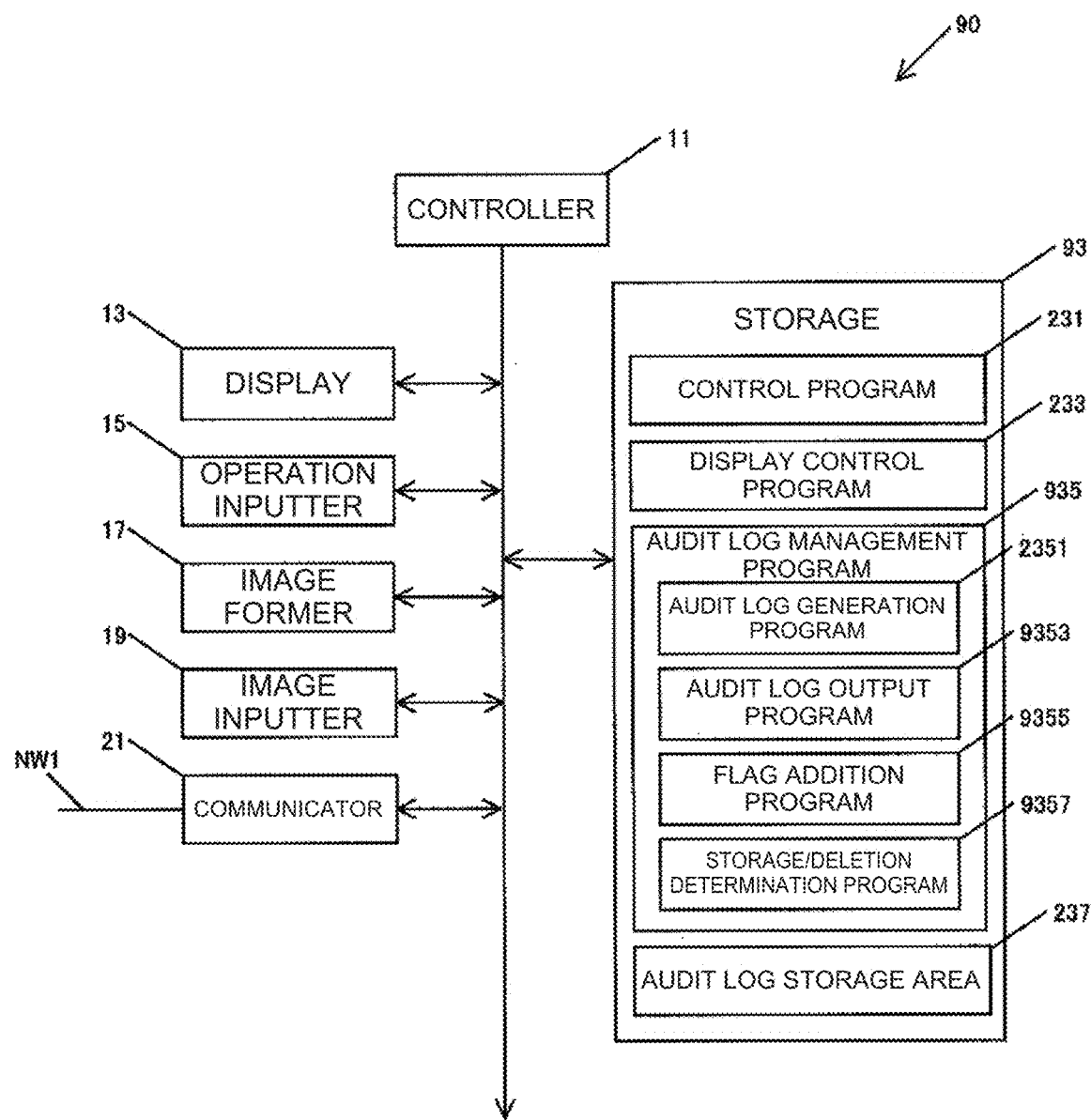
FIG. 15 is a functional configuration diagram of a multifunction peripheral according to the second embodiment.

FIG. 15 is a functional configuration diagram of the multifunction peripheral 90 according to the second embodiment. The multifunction peripheral 90 is an apparatus in which a function of reading and outputting an audit log to be stored based on a set schedule, and a function of adding a transmitted flag as second identification information indicating that the audit log has been output to the server apparatus 70 are added to the functional configuration of the multifunction peripheral 10 according to the first embodiment. Since other functional configurations can be made the same as those of the multifunction peripheral 10, the same component is denoted by the same reference sign, and description thereof is omitted.

In the second embodiment, a storage 93 stores a control program 231, a display control program 233, and an audit log management program 935, and secures an audit log storage area 237.

The audit log management program 935 includes an audit log generation program 2351, an audit log output program 9353, a flag addition program 9355, and a storage/deletion determination program 9357.

The audit log output program 9353 includes a function as a second outputter that reads an audit log to be stored in the audit log storage area 237, and transmits the audit log to the server apparatus 70, based on a set schedule, in addition to a function to be implemented by a controller 11 that has read the audit log output program 2353.

The flag addition program 9355 includes a function of adding a transmitted flag to a transmitted audit log, in addition to a function to be implemented by the controller 11 that has read the flag addition program 2355.

The storage/deletion determination program 9357 includes a function of determining an audit log to be deleted according to an addition status of a saved flag and/or a transmitted flag added to an audit log, in addition to a function to be implemented by the controller 11 that has read the storage/deletion determination program 2357.

2.1.3 Information Processing Apparatus 50

Since the functional configuration of the information processing apparatus according to the second embodiment can be made the same as the functional configuration of the information processing apparatus 50 according to the first embodiment, the same component is denoted by the same reference sign, and description thereof is omitted herein.

2.1.4 Server Apparatus 70

Figure 16:
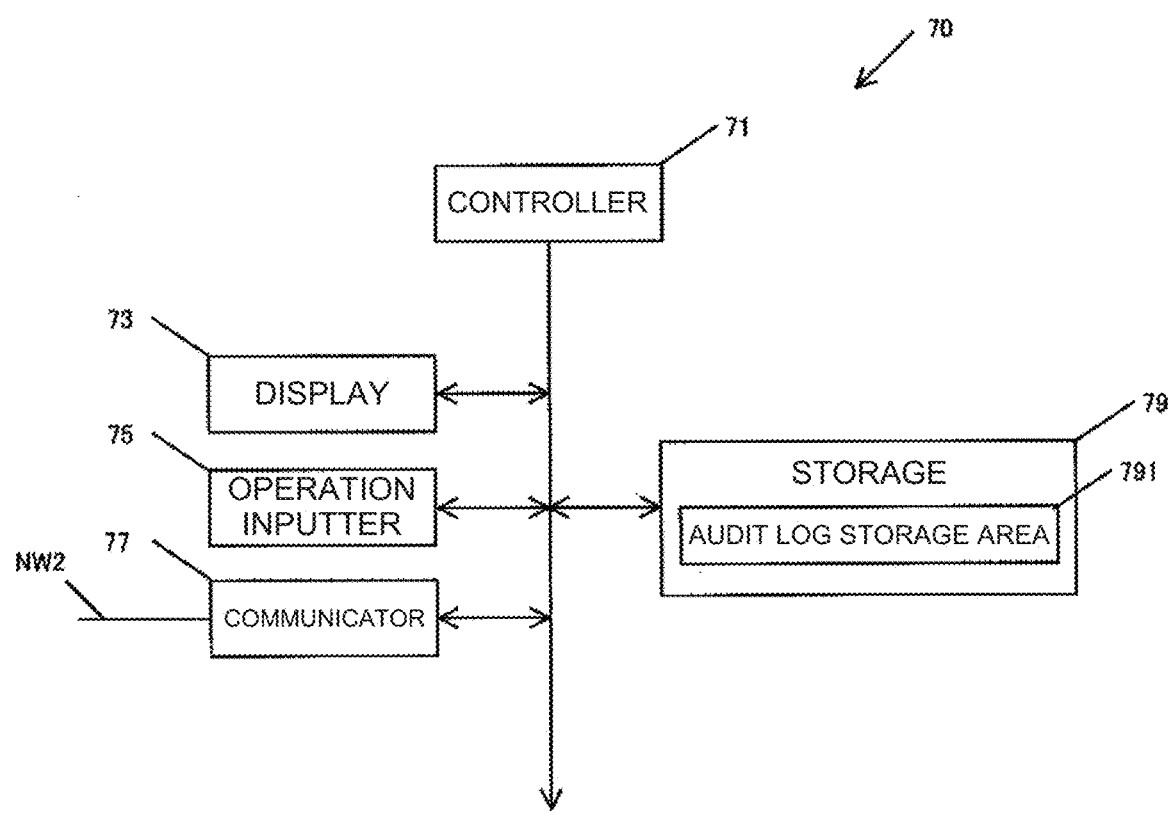
FIG. 16 is a functional configuration diagram of a server apparatus according to the second embodiment.

FIG. 16 is a functional configuration diagram of the server apparatus 70. The server apparatus 70 includes a controller 71, a display 73, an operation inputter 75, a communicator 77, and a storage 79, and can be configured as a general file server apparatus. Note that, in the second embodiment, a file server apparatus is assumed as a server apparatus, but the server apparatus may be configured as a network attached storage (NAS) without a server function.

The controller 71 controls the entirety of the server apparatus 70. The controller 71 can be configured of, for example, one or a plurality of arithmetic devices (CPUs or the like). The controller 71 achieves each function by reading and executing various programs stored in the storage 79.

The display 73 displays various pieces of information to the user or the like. The display 73 can be configured of, for example, an LCD, an organic EL display, a micro LED display, a mini LED display, or the like.

The operation inputter 75 receives an input of information from the user or the like. The operation inputter 75 can be configured of, for example, an input device such as a keyboard, a mouse, or a touch panel.

The communicator 77 includes, for example, one or both of a wired interface and a wireless interface for communicating with another device via the network NW2 such as a LAN, a WAN, or the Internet, or the network NW1.

The storage 79 stores various programs necessary for an operation of the server apparatus 70, and various pieces of data. The storage 79 can be configured of, for example, a storage device such as a RAM, an HDD, an SSD, or a ROM.

In the second embodiment, the storage 79 secures at least an audit log storage area 791. The audit log storage area 791 is a storage area for storing an audit log transmitted from the multifunction peripheral 90, based on a set schedule.

2.2 Flow of Processing

2.2.1 Overall Processing

Figure 17:
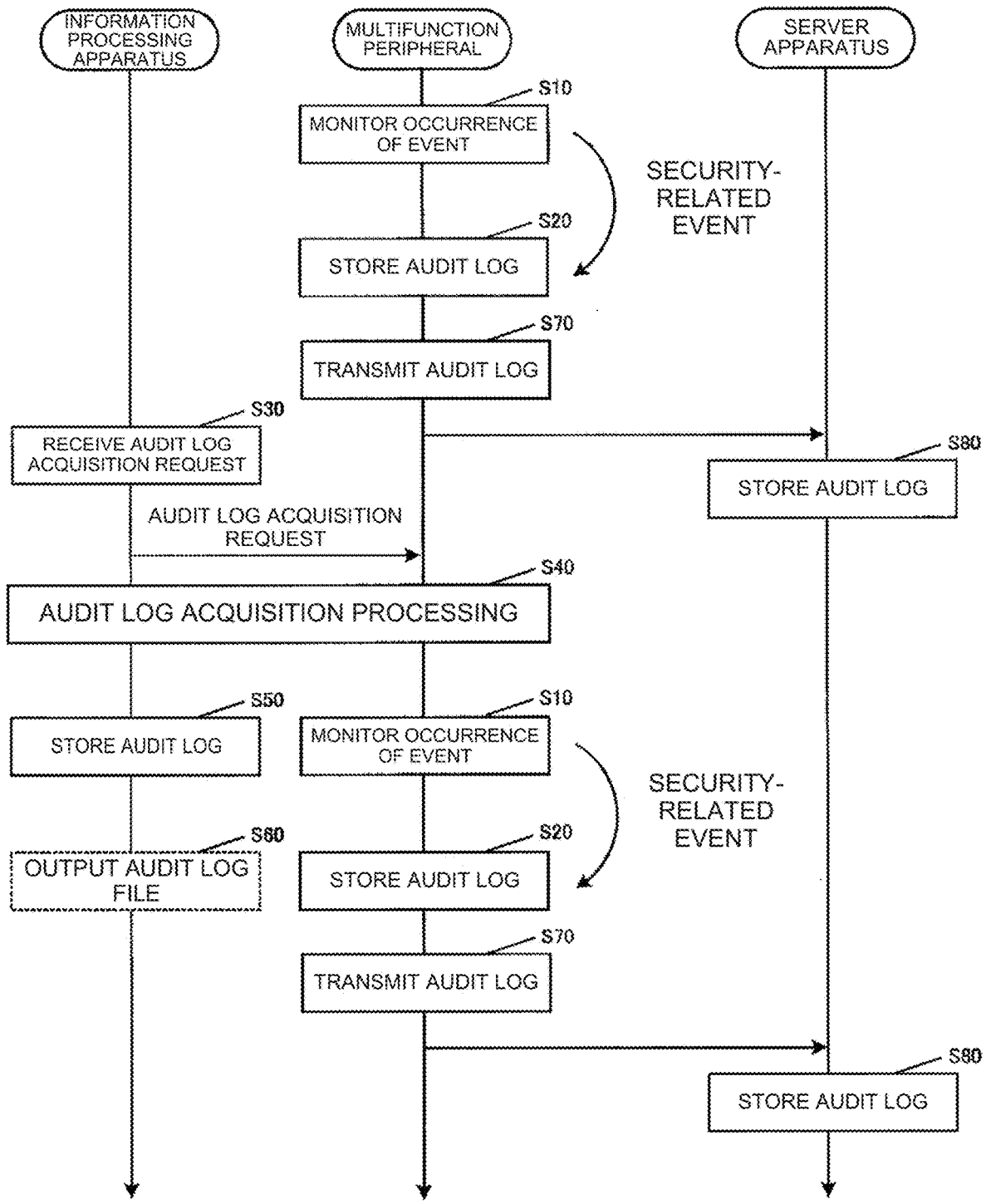
FIG. 17 is a sequence diagram illustrating overall processing according to the second embodiment.

Next, a flow of processing according to the second embodiment is described. The overall processing according to the second embodiment is processing in which a sequence diagram in FIG. 4 of the first embodiment is replaced with FIG. 17. The same processing as the processing described with reference to FIG. 4 is denoted by the same step number, and description thereof is omitted.

The multifunction peripheral 90 stores a generated audit log in the audit log storage area 237 (step S20). Subsequently, the multifunction peripheral 90 transmits the audit log to the server apparatus 70, based on a set schedule (step S70). Then, the server apparatus 70 stores the audit log transmitted from the multifunction peripheral 90 in the audit log storage area 791 (step S80). Note that, the multifunction peripheral 90 may transmit the audit log to the server apparatus 70 at a timing when the audit log is stored in the audit log storage area 237, in addition to the set schedule. A transmission timing (transmission schedule) of an audit log to the server apparatus 70 can be set optionally.

2.2.2 Processing of Multifunction Peripheral 90

Figure 18:
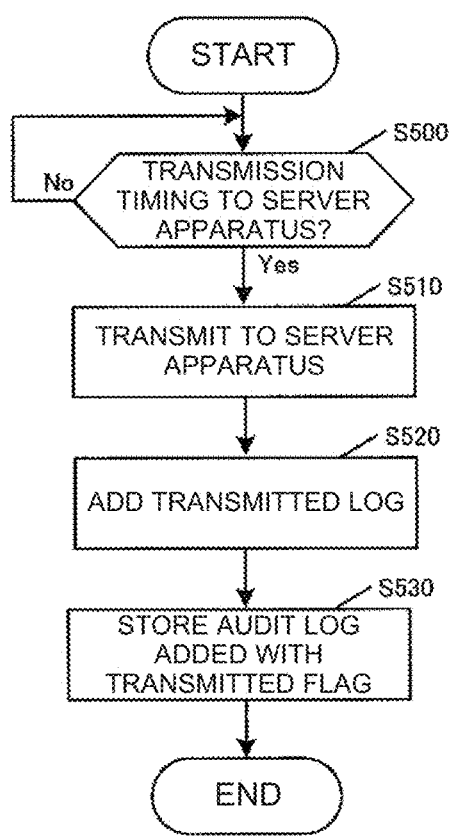
FIG. 18 is a flowchart illustrating a flow of processing according to the second embodiment.

Next, processing to be performed by the multifunction peripheral 90 is described. FIG. 18 is a flowchart illustrating transmission processing of an audit log in step S70 in FIG. 17. The processing described herein is processing to be performed by mainly reading the audit log management program 935 (the audit log generation program 2351, the audit log output program 9353, the flag addition program 9355, and the like) by the controller 11 of the multifunction peripheral 90. Note that, since processing of adding a saved flag and the like can be made the same as the processing described with reference to the flowcharts in FIGS. 5 to 7, description thereof is omitted herein.

First, the controller 11 determines whether it is a transmission timing of an audit log stored in the audit log storage area 237 (step S500). In a case where it is determined that it is a transmission timing of an audit log, the controller 11 reads the audit log from the audit log storage area 237, and transmits the audit log to the server apparatus 70 (step S500; Yes→step S510). On the other hand, in a case where it is determined that it is not a transmission timing of an audit log, the controller 11 waits until it becomes a transmission timing of an audit log (step S500; No).

After transmission of an audit log to the server apparatus 70, the controller 11 adds a transmitted flag to the transmitted audit log (step S520), and stores the audit log added with the transmitted flag in the audit log storage area 237 (step S530). Note that, the audit log added with the transmitted flag may be stored in a storage area different from a storage area (audit log storage area 237) of an audit log added with a saved flag.

Figure 19:
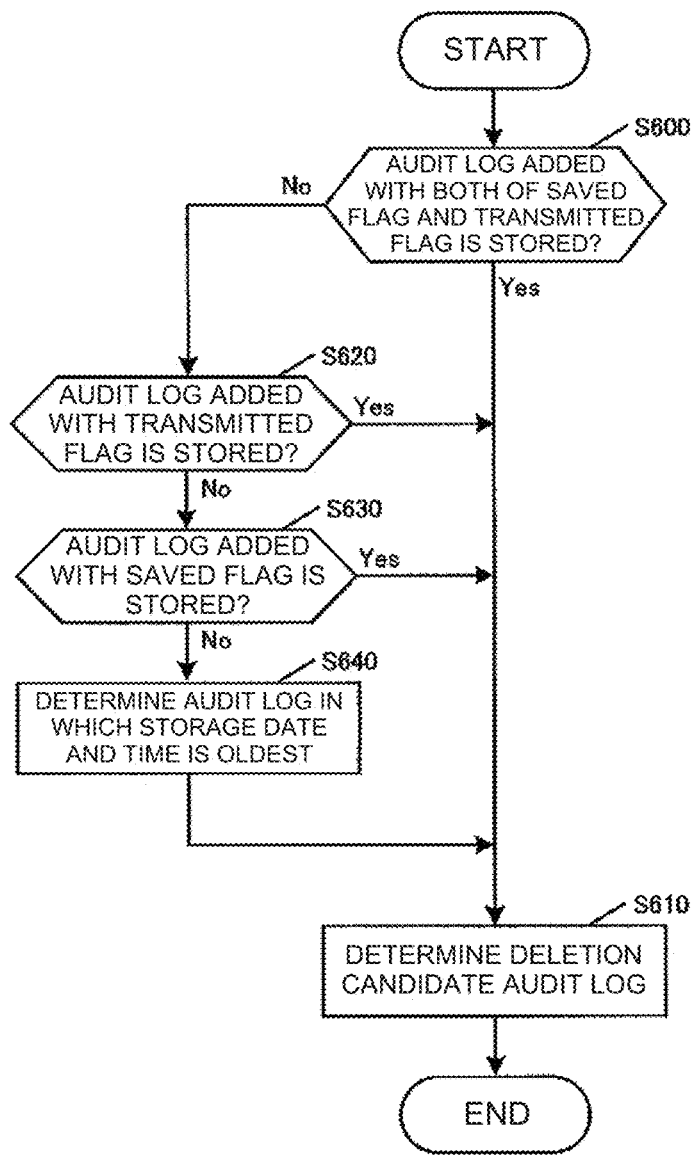
FIG. 19 is a flowchart illustrating a flow of processing according to the second embodiment.

Next, processing of determining a deletion candidate audit log according to the second embodiment is described with reference to a flowchart in FIG. 19. The processing described herein is processing to be performed by reading the audit log management program 935 (storage/deletion determination program 9357) by the controller 11 of the multifunction peripheral 90.

First, the controller 11 determines whether an audit log added with both of a saved flag and a transmitted flag is stored in the audit log storage area 237 or the like (step S600). In a case where it is determined that an audit log added with both of a saved flag and a transmitted flag is stored, the controller 11 determines the audit log, as a deletion candidate audit log, and finishes the processing (step S600; Yes→step S610).

On the other hand, in a case where it is determined that an audit log added with both of a saved flag and a transmitted flag is not stored in the audit log storage area 237 or the like, the controller 11 determines whether an audit log added with a transmitted flag is stored (step S600; No→step S620). When it is determined that an audit log added with a transmitted flag is stored, the controller 11 determines the audit log, as a deletion candidate audit log, and finishes the processing (step S620; Yes→step S610).

On the other hand, when it is determined that an audit log added with a transmitted flag is not stored, the controller 11 determines whether an audit log added with a saved flag is stored (step S620; No→step S630). When it is determined that an audit log added with a saved flag is stored, the controller 11 determines the audit log, as a deletion candidate audit log, and finishes the processing (step S630; Yes→step S610).

Note that, when it is determined that an audit log added with a saved flag is not stored, the controller 11 determines the audit log in which the storage date and time is oldest (step S630; No→step S640). Then, the controller 11 determines the determined audit log, as a deletion candidate audit log, and finishes the processing (step S610).

2.3 Operation Example

Figure 20:
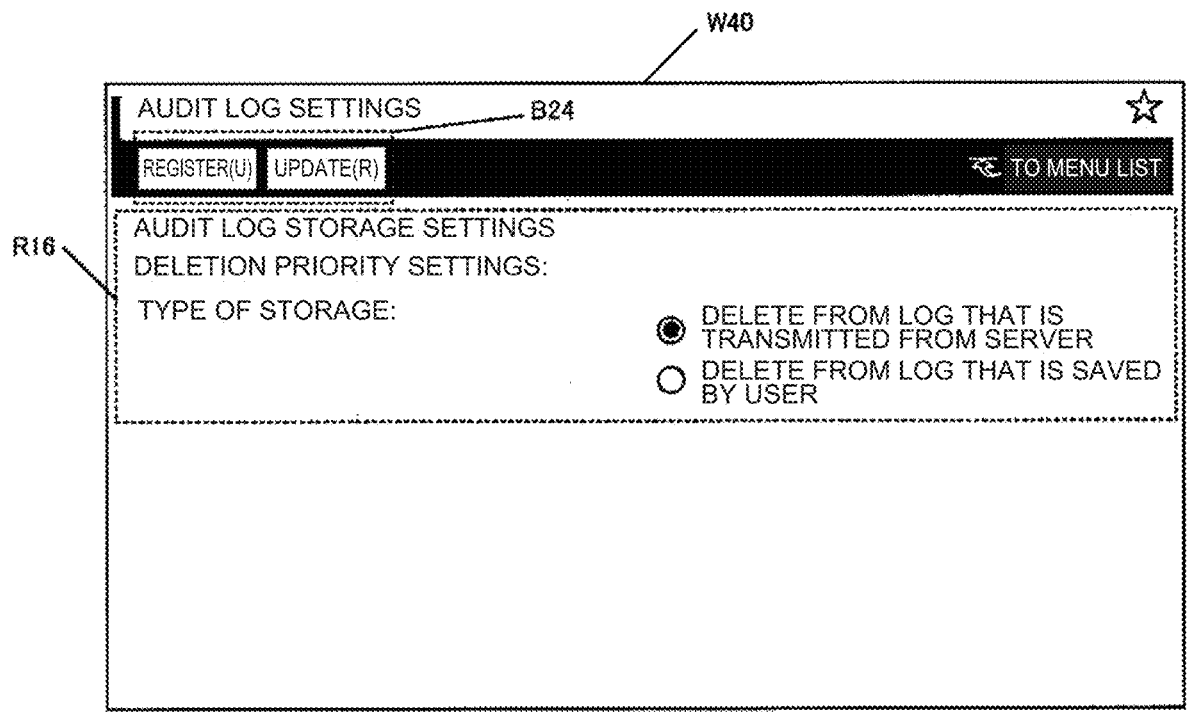
FIG. 20 is a diagram illustrating an operation example according to the second embodiment.

Next, an operation example according to the second embodiment is described. FIG. 20 is a diagram illustrating a configuration example of an audit log setting screen W40 for receiving selection of a priority as to whether an audit log added with a transmitted flag is to be deleted, or an audit log added with a saved flag is to be deleted in determining a deletion target audit log.

The audit log setting screen W40 includes a registration/update button B24, and an audit log storage setting area R16. The registration/update button B24 is an operation button for receiving settings on a priority of an audit log to be deleted based on a setting content in the audit log storage setting area R16. For example, in the audit log storage setting area R16, when the user selects a radio button "delete from a log that has been transmitted to a server", the controller 11 determines an audit log added with both of a transmitted flag and a saved flag, as the highest priority candidate to be deleted, and determines deletion candidate audit logs in order of an audit log added with a transmitted flag, an audit log added with a saved flag, and an audit log to which neither a transmitted flag nor a saved flag is added, and in which the storage date and time is oldest. On the other hand, when the user selects a radio button "delete from a log that has been saved by the user", the controller 11 determines an audit log added with both of a transmitted flag and a saved flag, as the highest priority candidate to be deleted, and determines deletion candidate audit logs in order of an audit log added with a saved flag, an audit log added with a transmitted flag, and an audit log to which neither a transmitted flag nor a saved flag is added, and in which the storage date and time is oldest.

As described above, in the second embodiment, in determining an audit log to be deleted, it is possible to provide, as a user interface, the audit log setting screen W40 for receiving selection of a priority as to whether an audit log added with a transmitted flag is to be deleted, or an audit log added with a saved flag is to be deleted. Including a configuration as described above allows the user to flexibly and easily select a priority of an audit log to be deleted.

In the second embodiment, it is possible to review an audit log output to the server apparatus 70. As illustrated in FIG. 21A, for example, the multifunction peripheral 90 according to the second embodiment outputs an audit log to the server apparatus 70 in a predetermined format. However, even when the audit log is displayed in the format in which the audit log has been output to the server apparatus 70, it is difficult for some users to recognize a content of the audit log at a glance. In the second embodiment, as illustrated in FIG. 21B, it is possible to display a content of an audit log transmitted from the multifunction peripheral 90 to the server apparatus 70 in a display format easily recognizable by the user. Note that, an audit log review screen illustrated in FIG. 21B can also be displayed by the information processing apparatus 50. In this way, in the second embodiment, it is possible to review an audit log in two patterns, namely, a pattern in which an audit log stored in the information processing apparatus 50 is reviewed, and a pattern in which an audit log stored in the server apparatus 70 is reviewed. Including a configuration as described above allows the user to flexibly perform an operation of reviewing an audit log.

As described above, according to the second embodiment, in addition to the advantageous effect of the first embodiment, in a case where a transmitted flag is added to a transmitted audit log, and the storage amount of audit logs has reached the upper limit, in addition to addition of a saved flag according to the first embodiment, an audit log to be deleted is determined according to an addition status of a saved flag and/or a transmitted flag. Therefore, the user can more flexibly manage the audit log.

3 Third Embodiment

A third embodiment is an embodiment in which priorities are given to types of audit logs to be deleted, and the order of candidates to be deleted can be selected based on the types of audit logs, in the second embodiment.

Since a functional configuration of a multifunction peripheral and the like constituting a system according to the third embodiment can be made the same as the functional configuration described in the second embodiment, description thereof is omitted herein. Further, since a flow of processing to be performed by a multifunction peripheral and the like constituting the system according to the third embodiment can also be made the same as the flow of processing described in the second embodiment, description thereof is omitted herein.

Figure 22:
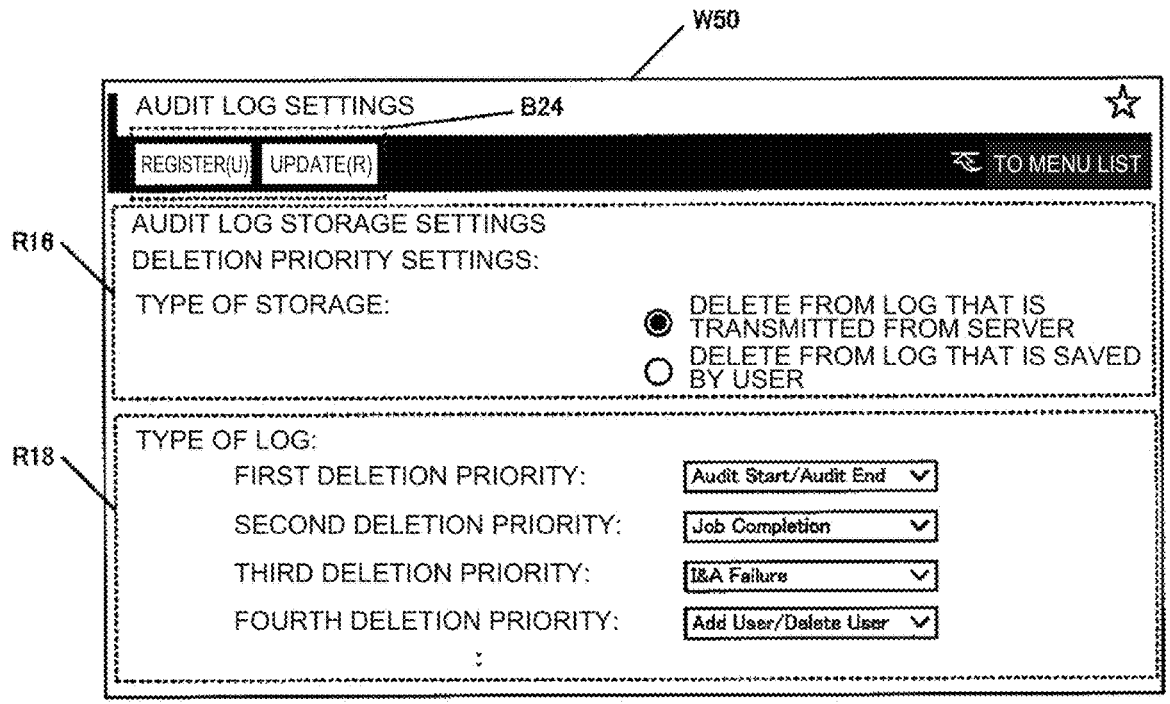
FIG. 22 is a diagram illustrating an operation example according to a third embodiment.

FIG. 22 is a diagram illustrating a configuration example of an audit log setting screen W50 according to the third embodiment. Note that, the same component as the component capable of constituting the audit log setting screen W40 according to the second embodiment described with reference to FIG. 20 is denoted by the same reference sign, and description thereof is omitted.

The audit log setting screen W50 includes a registration/update button B24, an audit log storage setting area R16, and a log type selection area R18. The log type selection area R18 is a selection area for receiving selection of a type of an audit log to be deleted based on a priority. A controller 11 of a multifunction peripheral 90 determines (a type of) an audit log to be deleted based on a priority of an audit log selected by the user via the log type selection area R18.

For example, FIG. 22 is an example in which "Audit Start/Audit End" is set as a first deletion priority, "Job Completion" is set as a second deletion priority, "I & A Failure" is set as a third deletion priority, and "Add User/Delete User" is set as a fourth deletion priority.

Figure 23:
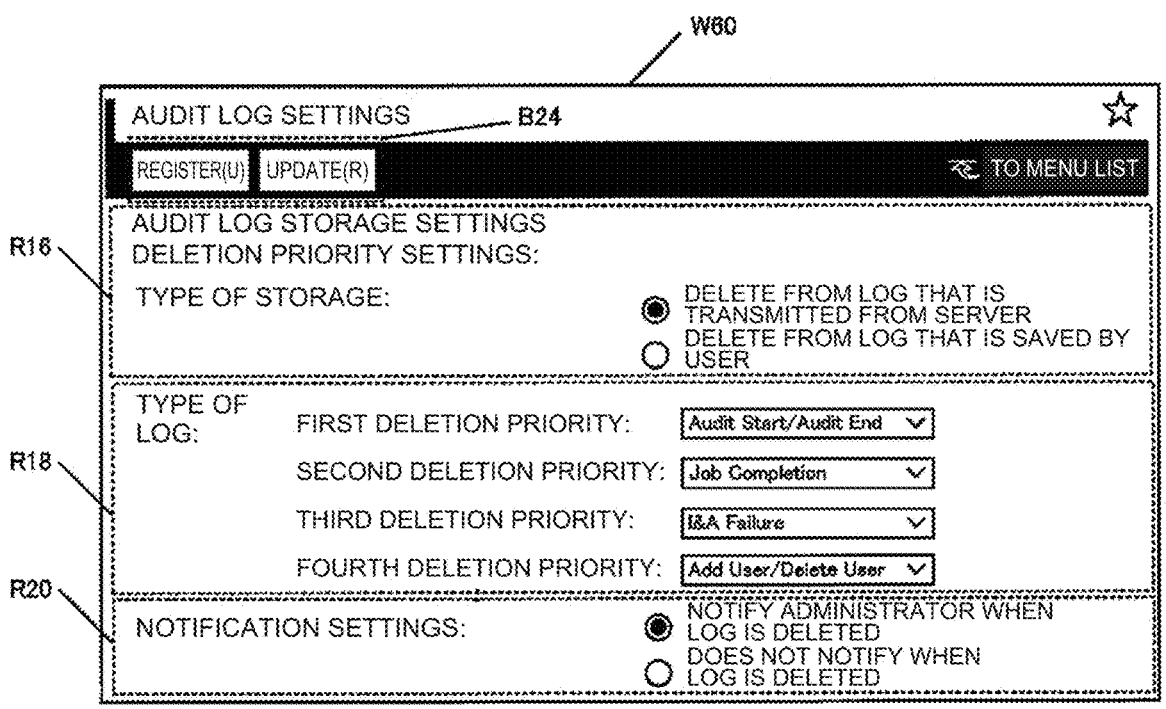
FIG. 23 is a diagram illustrating an operation example according to the third embodiment.

Further, FIG. 23 is a diagram illustrating a configuration example of an audit log setting screen W60 in which a notification setting area R20 for receiving settings as to whether to notify the administrator when deleting an audit log is provided in the configuration of the audit log setting screen W50 illustrated in FIG. 22.

The notification setting area R20 includes radio buttons for selecting one of "notify the administrator when a log is deleted, and "does not notify when a log is deleted. Allowing the user (administrator) to select a radio button on a desired notification method makes it possible to set enable/disable notification related to deletion of an audit log.

Figure 24:
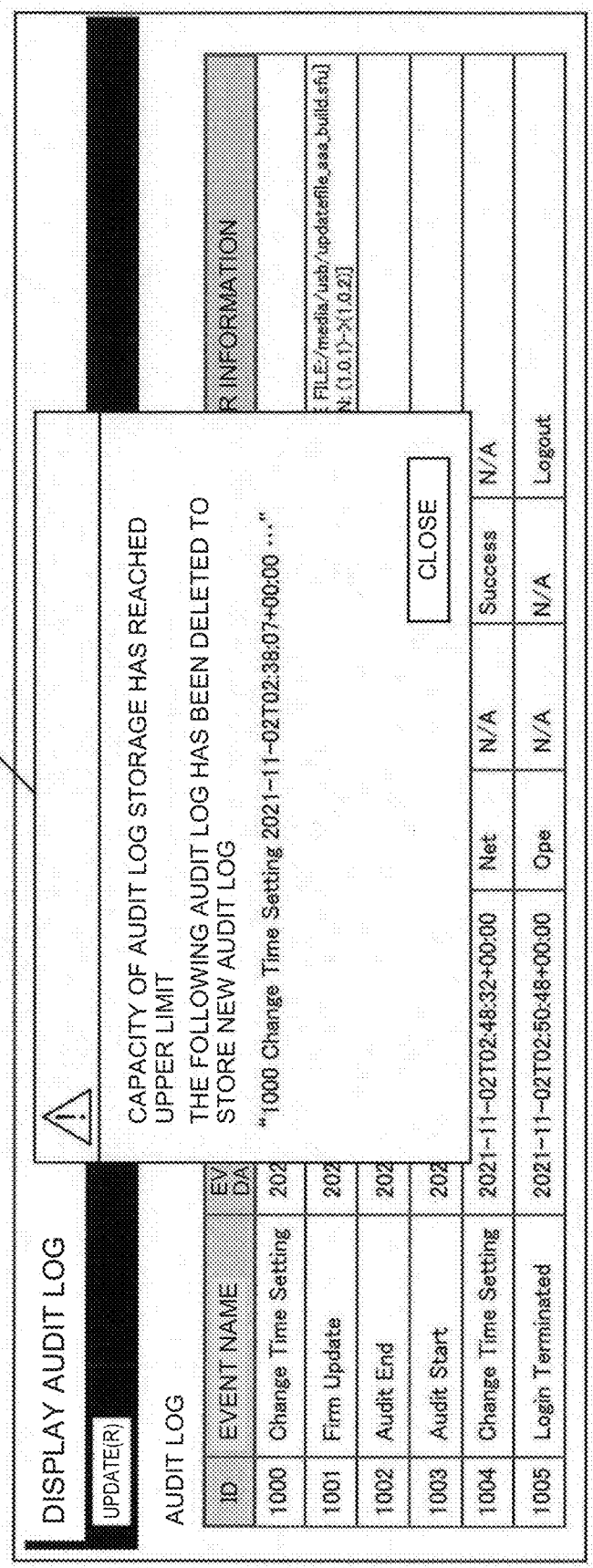
FIG. 24 is a diagram illustrating an operation example according to the third embodiment.

FIG. 24 is a diagram illustrating a configuration example of a message screen M10 to be displayed, in a case where notification settings are set to be enabled by selecting a radio button "notify the administrator when a log is deleted" in the notification setting area R20 on the audit log setting screen W60.

FIG. 24 is an example in which a message "the capacity of the audit log storage has reached the upper limit. To store a new audit log, the following audit log has been deleted" is a display content of the message screen M10.

As described above, according to the third embodiment, in addition to the advantageous effect of the second embodiment, since a type of an audit log to be deleted can be set based on a priority, more convenient audit log management can be performed, for example, an audit log with a low necessity of review can be positively deleted, and an audit log with a high necessity of review can be left.

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

Although some parts of the above-described embodiments are separately described for convenience of explanation, it is needless to say that the embodiments may be combined and implemented within a technically allowable range.

In addition, a program operating in each device in the embodiments is a program (a program causing a computer to function) that controls a CPU or the like in such a way as to achieve functions of the above-described embodiments. The embodiments have been described based on a premise that a plurality of programs are simultaneously executed as necessary by multi-task processing. Further, information to be handled by these devices is temporarily stored in a temporary storage device (e.g., a RAM) at a time of the processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. An image processing apparatus comprising:
a controller capable of generating occurrence of an event to be audited, as log information;
a storage that stores the log information;
an outputter that reads and outputs the log information stored in the storage in response to an acquisition request for the log information by an information processing apparatus; and
an adder that adds, to the log information, identification information indicating that the log information has been stored in the information processing apparatus, wherein
the controller stores the log information added with the identification information in the storage, and
in a case where a storage amount of the log information stored in the storage has reached an upper limit when newly storing the log information generated in association with occurrence of the event, the controller deletes the log information added with the identification information from the storage, and stores the generated log information.

2. The image processing apparatus according to claim 1, wherein
the controller deletes, from the storage, the log information in which a storage date and time is oldest among the log information added with the identification information.

3. The image processing apparatus according to claim 2, wherein
the controller stores the number of times of addition of the identification information together with the log information added with the identification information, and
in a case where there are a plurality of pieces of the log information in which a storage date and time is oldest, the controller deletes, from the storage, the log information in which the number of times of addition of the identification information is largest.

4. The image processing apparatus according to claim 3, wherein
the controller determines a priority of the log information to be deleted from the storage according to a type of a log.

5. The image processing apparatus according to claim 4, further comprising a setter that receives settings on the priority.

6. The image processing apparatus according to claim 5, further comprising a second outputter that reads and outputs the log information to be stored in the storage, based on a set schedule.

7. The image processing apparatus according to claim 6, wherein
the adder adds, to the log information output from the second outputter, second identification information different from the identification information, and
the controller determines a candidate of the log information to be deleted from the storage according to the identification information or the second identification information added to the log information.

8. The image processing apparatus according to claim 7, wherein
the controller determines, as a highest priority candidate of the log information to be deleted from the storage, the log information added with both of the identification information and the second identification information, and
determines a candidate of the log information to be deleted from the storage in order of the log information added with the second identification information, the log information added with the identification information, and the log information to which neither the identification information nor the second identification information is added.

9. The image processing apparatus according to claim 8, further comprising a setter that receives settings on an order for candidate to be deleted from the storage, of the log information added with the second identification information and the log information added with the identification information.

10. The image processing apparatus according to claim 1, wherein the event to be audited is an operation event related to security, and the log information is an audit log.

11. A log information management system comprising:
an information processing apparatus including
a requester that requests an image processing apparatus to acquire log information generated based on occurrence of an event to be audited,
a storage that stores the log information acquired from the image processing apparatus, and
a file outputter that outputs the log information stored in the storage, as a file; and
the image processing apparatus including
a controller capable of generating the log information,
a storage that stores the log information,
an outputter that reads and outputs the log information stored in the storage in response to an acquisition request for the log information by the information processing apparatus, and
an adder that adds, to the log information, identification information indicating that the log information has been stored in the storage of the information processing apparatus, wherein
the controller stores the log information added with the identification information in the storage, and
in a case where a storage amount of the log information stored in the storage has reached an upper limit when newly storing the log information generated in association with occurrence of the event, the controller deletes the log information added with the identification information from the storage, and stores the generated log information.

12. The log information management system according to claim 11, wherein
the image processing apparatus includes a second outputter that reads the log information to be stored in the storage, and outputs the log information to a server apparatus, based on a set schedule, and
the adder adds, to the log information output from the second outputter, second identification information different from the identification information.

13. A log information management method comprising:
generating occurrence of an event to be audited, as log information;
storing the generated log information in a storage device;
reading and outputting the log information stored in the storage device in response to an acquisition request for the log information by an information processing apparatus; and
adding, to the log information, identification information indicating that the log information has been stored in the information processing apparatus, wherein
the method further includes
storing the log information added with the identification information in the storage device, and in a case where a storage amount of the log information stored in the storage device has reached an upper limit when newly storing the log information generated in association with occurrence of the event, deleting the log information added with the identification information from the storage device, and storing the generated log information.

14. The log information management method according to claim 13, further comprising:
reading the log information stored in the storage device, and outputting the log information to a server apparatus, based on a set schedule; and
adding, to the output log information, second identification information different from the identification information.

* * * * *